US012807463B2

(12) United States Patent
Averill

(10) Patent No.: US 12,807,463 B2
(45) **Date of Patent: *Nov. 24, 2026**

(54) CIRCUMFERENTIAL RESTRAINT FOR PIVOTING ARM OF VEHICLE LIFT

(71) Applicant: Vehicle Service Group, LLC, Madison, IN (US)

(72) Inventor: Bryan Averill, Portland, OR (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,810

(22) Filed: Mar. 27, 2024

(65) Prior Publication Data

US 2024/0327177 A1 Oct. 3, 2024

Related U.S. Application Data

(60) Provisional application No. 63/456,321, filed on Mar. 31, 2023.

(51) Int. Cl.
*B66F 7/28* (2006.01)

(52) U.S. Cl.
CPC .................................... *B66F 7/28* (2013.01)

(58) Field of Classification Search
CPC .................................... B66F 7/28; B66F 7/00
See application file for complete search history.

(56) References Cited

U.S. PATENT DOCUMENTS

| | | | | |
|---|---|---|---|---|
| 4,825,977 A * | 5/1989 | Isogai | B66F 7/02 187/206 |
| 7,150,073 B2 | 12/2006 | Stewart | |
| 11,401,143 B2 | 8/2022 | Benz | |
| 11,591,195 B2 | 2/2023 | Heath et al. | |
| 12,134,549 B2 * | 11/2024 | Taylor | B66F 7/28 |

(Continued)

FOREIGN PATENT DOCUMENTS

| | | |
|---|---|---|
| CN | 107215815 A | 9/2017 |
| CN | 108751002 A * | 11/2018 |

(Continued)

OTHER PUBLICATIONS

European Extended Search Report and Written Opinion dated Aug. 29, 2024, for Application No. 24167771.5, 6 pages.

*Primary Examiner* — Minh Truong
*Assistant Examiner* — Michelle M Mudwilder
(74) *Attorney, Agent, or Firm* — FBT Gibbons LLP

(57) ABSTRACT

A vehicle engagement assembly includes a base frame having a pair of flanges, each defining a respective base pin hole, a lift arm having an upper flange defining an arm pin hole and a lower flange, and a pivot restraint mechanism. The pivot restraint mechanism is able to inhibit rotation of the lift arm relative to the base frame about a pivot axis. The pivot restraint mechanism includes an arm restraint body, a base frame restraint body, and a rotational stopping surface. The arm restraint body and base frame restraint body are located between the upper flange and lower flange of the lift arm with the pin extending through each. The rotational stopping surface can abut against a surface of either the base frame restraint body or the arm restraint body to rotationally fix either to the respective base frame or lift arm about the pivot axis.

19 Claims, 29 Drawing Sheets

(56) References Cited

U.S. PATENT DOCUMENTS

| | | | | |
|---|---|---|---|---|
| 2013/0233651 | A1* | 9/2013 | Kritzer | B66F 3/46 187/208 |
| 2016/0122168 | A1* | 5/2016 | Benz | B66F 13/00 254/133 R |
| 2021/0114852 | A1 | 4/2021 | Heath et al. | |
| 2021/0331904 | A1* | 10/2021 | Kritzer | B66F 7/28 |
| 2023/0130107 | A1 | 4/2023 | Murru et al. | |

FOREIGN PATENT DOCUMENTS

| | | | | |
|---|---|---|---|---|
| CN | 116374879 | A | 7/2023 | |
| DE | 102007020041 | A1 * | 10/2008 | B66F 7/28 |
| EP | 0478035 | B1 | 2/1995 | |
| EP | 1156009 | A1 * | 11/2001 | B66F 7/28 |
| KR | 960003806 | Y1 * | 5/1996 | |
| KR | 100501430 | B1 | 7/2005 | |
| KR | 101948553 | B1 | 2/2019 | |
| KR | 102351333 | B1 | 1/2022 | |
| WO | WO 2014/127238 | A2 | 8/2014 | |

* cited by examiner

CIRCUMFERENTIAL RESTRAINT FOR PIVOTING ARM OF VEHICLE LIFT

PRIORITY

This application claims priority to U.S. Provisional Application No. 63/456,321, entitled "Circumferential Restraint for Pivoting Arm of Vehicle Lift," filed on Mar. 31, 2023, the disclosure of which is incorporated by reference herein.

BACKGROUND

A vehicle lift is a device operable to lift a vehicle such as a car, truck, bus, etc. Vehicle lifts have varying designs and capabilities, including platform lifts that lift a parked vehicle via contact with tires in order to allow access to the underside of the vehicle; as well as frame-engaging lifts that raise a vehicle by contacting structural lifting points on the frame of the vehicle, allowing access to the underside of the vehicle and allowing wheels and tires to be removed or serviced.

Since vehicle service often includes removing or inspecting tires and wheels, frame-engaging lifts are a popular option. Vehicle lifts may include adjustable arms configured to adjust into various positions to suitably engage the frame of a vehicle. In some instances, an adjustable arm may be able to adjust its own length to suitably engage the frame of a vehicle. Additionally, or alternatively, an adjustable arm may be configured to pivot relative to other portions of the vehicle lift to suitably engage the frame of a vehicle.

While a variety of vehicle lifts have been made and used, it is believed that no one prior to the inventor(s) has made or used an invention as described herein.

BRIEF DESCRIPTION OF THE DRAWINGS

While the specification may conclude with claims which particularly point out and distinctly claim the invention, it is believed the present invention will be better understood from the following description of certain examples taken in conjunction with the accompanying drawings, in which like reference numerals identify the same elements and in which:

Figure 1A:
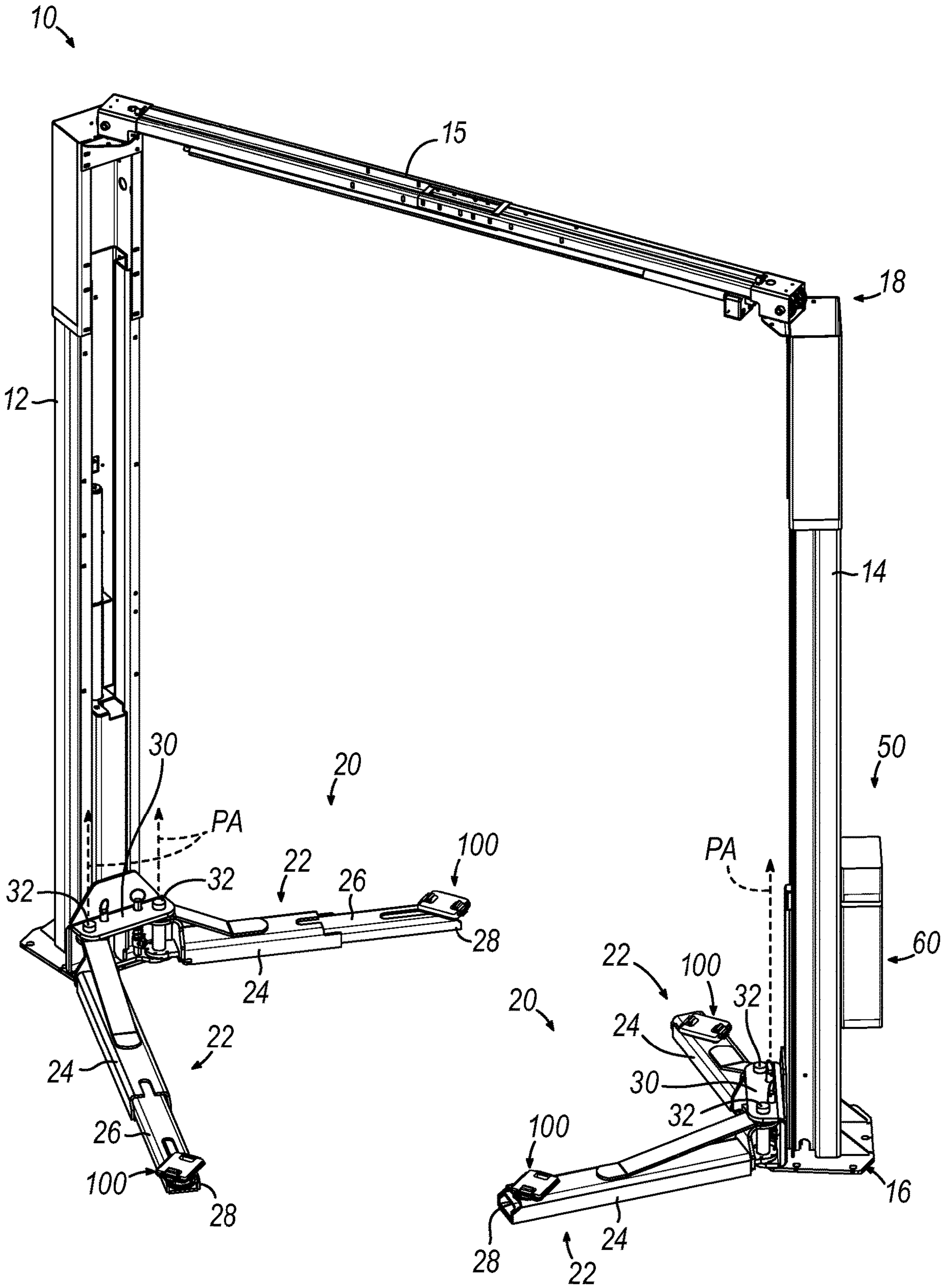
FIG. 1A is a perspective view of an illustrative two-post lift assembly in a lowered configuration.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the resent invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is, by way of illustration, just one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Overview of Illustrative Frame-Engaging Lift

Figure 1B:
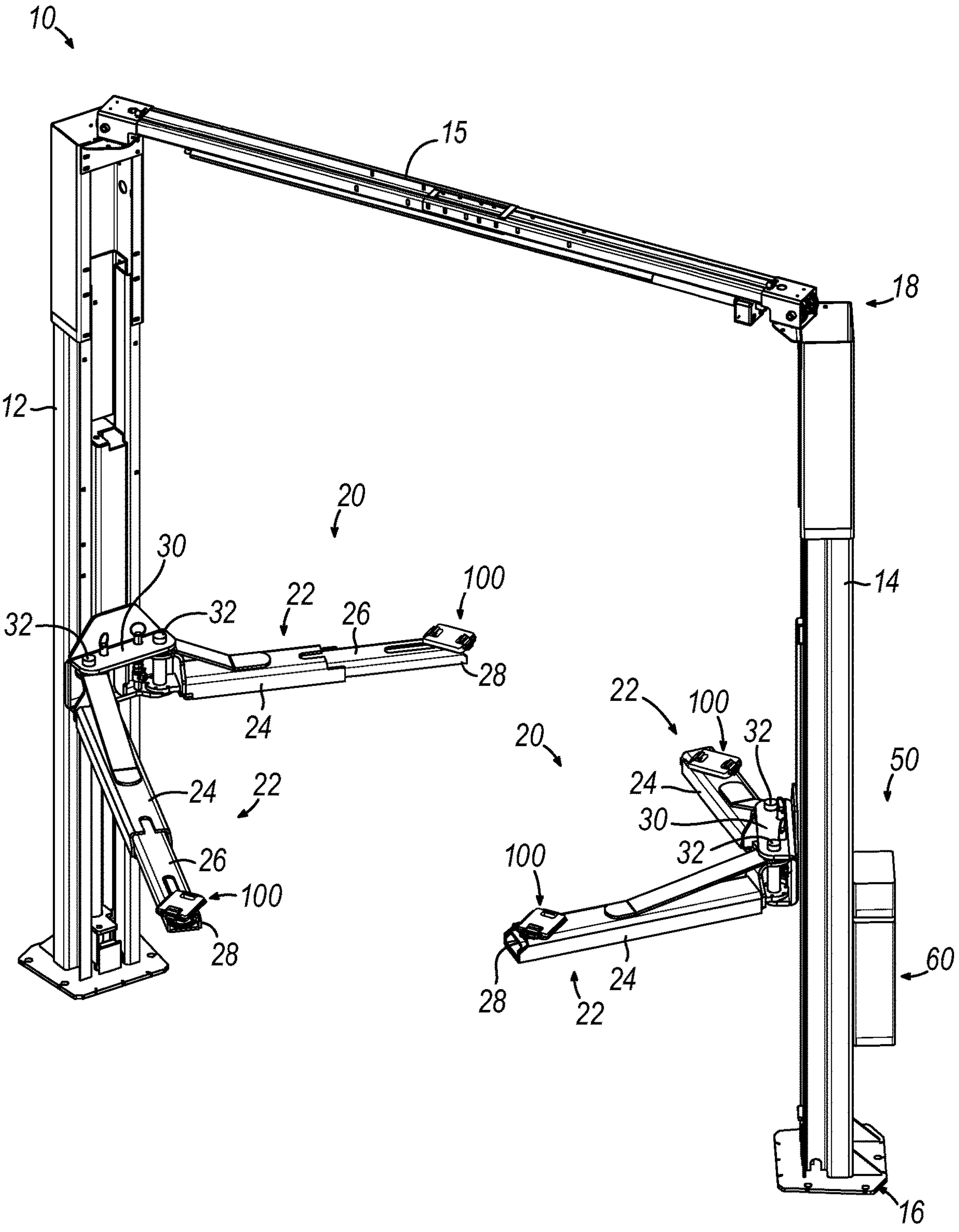
FIG. 1B is a perspective view of the two-post lift assembly of FIG. 1A in a raised configuration.

FIGS. 1A-1B show an illustrative frame-engaging vehicle lift, a two-post lift (10), that can be used to raise a vehicle, allow access to the underside of the vehicle, and allow wheels and tires of the vehicle to be removed or serviced. While the current frame-engaging vehicle lift is a two-post lift (10), any other suitable frame-engaging vehicle lift may be used as would be apparent to one skilled in the art in view of the teachings herein. For example, the frame-engaging vehicle lift may be a scissor-lift assembly, a four-post lift, an in-ground lift, one or more portable lifts, etc.

Two-post lift (10) includes a pair of lift posts (12, 14), a crossbar (15) extending between lift posts (12, 14), a pair of lifting carriages (20) operatively coupled to a respective lift post (12, 14), a control assembly (50), and a drive assembly (60). Lift posts (12, 14) extend from a floor (16) to an elevated portion (18), while a crossbar (15) extends between lift posts (12, 14) around each at elevated portion (18). Crossbar (15), while entirely optional, may provide at least some degree of structural stability between lift posts (12, 14).

Lifting carriages (20) are configured to synchronously actuate along a path defined by respective lift posts (12, 14) between a lowered position (as shown in FIG. 1A) and a raised position (as shown in FIG. 1B). Lifting carriages (20) may also selectively lock into place relative to respective lift posts (12, 14) such that lifting carriages (20) may be prevented from inadvertently lowering once reaching a desired height. Therefore, lift posts (12, 14) may provide a mechanical path for respective lifting carriages (20) to actuate along. Any suitable components to promote synchronous actuation and locking of lifting carriages (20) relative to lift posts (12, 14) may be used as would be apparent to one skilled in the art in view of the teachings herein. As will be described in greater detail below, lifting carriages (20) are configured to engage the frame of a vehicle such that as lifting carriages (20) actuate between the lowered position (as shown in FIG. 1A) and the raised position (as shown in FIG. 1B) the vehicle will also be lifted and lowered between a corresponding lowered and raised position.

Each lifting carriage (20) includes a base frame (30) and a pair of adjustable lifting arms (22) configured to be adjusted relative to their respective base frame (30) and relative to each other in order to suitably engage a vehicle frame. Base frames (30) suitably engage their respective lift post (12, 14) such that lifting carriages (20) may synchronously actuate along their path defined by lift posts (12, 14).

Each lifting arm (22) includes a collar (24) and an adjustable body (26) that terminates in an adapter coupling end (28). Each collar (24) is pivotally coupled to base frame (30) of the respective carriage (20) about a pivot axis (PA) via a pivot pin (32). Therefore, collar (24), adjustable body (26), and adapter coupling end (28) may be pivoted about pivot axis (PA) together into various rotational positions relative to base frame (30). In some instances, carriages (20) may have a pivot restraint mechanism to selectively fix each collar (24) into a desired rotational position relative to base frame (30) about pivot axis (PA). Therefore, lifting arms (22) may be pivoted and restrained into a desired rotational position relative to base frame (30) of carriage (20) in order to suitably align with a specific vehicle frame for lifting purposes.

Adjustable body (26) may actuate along a linear path defined by a respective collar (24) and into various longitudinal positions relative to collar (24). In some instances, carriages (20) may have a linear locking mechanism to selectively fix the longitudinal position of adjustable body (26) relative to the respective collar (24). Therefore, adjustable body (26) may be actuated and locked into a desired longitudinal position relative to the respective collar (24) in order to suitably align with a specific vehicle frame for lifting purposes.

Adjustable body (26) and adapter coupling end (28) may be fixed relative to each other, although this is merely optional. Adapter coupling end (28) is configured to selectively couple with various arm adapters, such as arm adapter (100). Arm adapters (100) may be configured to suitably engage vehicle frames such that lifting carriages (20) may lift vehicles in accordance with the description herein.

Two-post lift (10) may be connected to a power supply (not pictured) to provide power to various components of two-post lift (10), such as control assembly (50) and drive assembly (60). Control assembly (50) is operatively connected to drive assembly (60) such that an operator may utilize control assembly (50) to selectively activate drive assembly (60) in accordance with the teachings herein. Control assembly (50) may include any suitable components, such as a processor, logic control, etc., as would be apparent to one skilled in the art in view of the teachings herein. Additionally, control assembly (50) may include any suitable number of user input features in order to utilize two-post lift (10) in accordance with the description herein. In the current example, control assembly (50) is physically attached to the rest of two-post lift (10), but this is merely optional. In some embodiments, control assembly (50) may be detached from the rest of two-post lift (10) such that control assembly (50) is in wired/wireless communication with other suitable components of two-post lift (10). In some embodiments, control assembly (50) is incorporated into a wireless pendant, a smart phone, a tablet, or a control station such as a desktop or laptop.

Drive assembly (60) is configured to raise and lower carriages (20) in accordance with the description herein by producing mechanical energy that is translated to a lifting motion of the carriages (20) through a mechanical linkage, hydraulic system, other systems, or any combination thereof as will be apparent to one skilled in the art in view of the teachings herein. Therefore, drive assembly (60) may include any number of suitable components to raise and lower carriages (20) in accordance with the description herein.

During illustrative use, the operator may place a vehicle between lift posts (12, 14) with carriages (20) at or near the lowered position. Next, the operator may suitably align carriages (20) with a frame of the vehicle by rotating and extending/retracting adjustable lift arms (22). When carriages (20) have been suitably positioned such that arm adapters (100) are aligned with the frame of the vehicle, the operator may utilize control assembly (50) in order to activate drive assembly (60) to synchronously raise carriages (20) such that arm adapters (100) engage the frame and thereby lift the vehicle. Once carriages (20) lift the vehicle to a desired height, the operator may utilize control assembly (50) to instruct drive assembly (60) to stop raising carriages (20). In some instances, a vertical lockout assembly may be used to ensure carriages (20) remain locked at the desired height along lift posts (12, 14).

When the operator desires to lower the vehicle, the operator may use control assembly (50) to activate drive assembly (60) to synchronously lower carriages (20) such the vehicle is lowered to the ground and arm adapters (100) disengage the frame of the vehicle. With arm adapters (100) disengaged from the frame of the vehicle, the vehicle may be removed from the lifting area, and another vehicle may be subsequently moved into the lifting area for service.

II. Illustrative Pivot Restraint Assemblies for Adjustable Lift Arms

As mentioned above, adjustable lift arms (22) may pivot relative to their base frame (30) about their pivot axis (PA) via a respective pivot pin (32). Such pivoting of lift arms (22) may be needed to suitably align an arm adapter (100) with a lift point on a vehicle frame. As also mentioned above, carriages (20) may have a pivot restraint mechanism to selectively fix the rotational position of lift arms (22) in the desired rotational position about their pivot axis (PA).

The pivot restraint mechanism may include a first restraint feature and a second, complementary restraint feature configured to selectively engage each other to rotationally lock lift arm (22) relative to base frame (30). Therefore, a first restraint feature may be associated with lift arm (22), while a second restraint feature may be associated with base frame (30) such that, if a rotational load were imparted on lift arm (22) while the pivot restraint mechanism was in the restrained configuration, lift arm (22) would be inhibited from rotating relative to base frame (30) via engagement between the first and second restraint features. In other words, such a rotational load would be transmitted from lift arm (22) onto base frame (30) via the pivot restraint mechanism. Previously, restraint features may have been configured to pivotally restrain lift arm (22) relative to base frame (30) in response to exposure to minimal lateral loads, such that a user may not accidentally pivot lift arm (22) out of rotational position relative to base frame (30) with accidental contact via minimal forces. However, in some instances, lift arm (22) may experience significantly larger lateral loads, such as if lift arm (22) lifts a vehicle while lift arm (22) is improperly positioned/engaged with lifted vehicle. In such instances, a large lateral load imparted on restraint features may undesirably damage restraint features.

A. First Illustrative Rotational Restraint Assembly

In some instances, it may be desirable to significantly improve the strength of first and second restraint features such that the restraint features can transmit large rotational loads from lift arm (22) onto base frame (30) without (A) causing the pivot restraint mechanism to fail, and/or (B) damaging components of the pivot restraint mechanism. However, improving the robustness of the pivot-restraint mechanism may lead to taking up an undesirable amount of space, thereby creating undesirable obstacles on the shop floor. Therefore, it may be desirable to accomplish such improvements while keeping the pivot restraint mechanism compact. Further, it may be desirable to achieve such improvements while allowing restraint features to be assembled on a shop floor without the need for specialized tools; and also allowing restraint features to be manufactured in an economically efficient manner.

FIGS. 2-7D show pivot restraint mechanism (570), which includes an arm restraint body (572) and a base frame restraint body (580), which are associated with a respective lift arm (522) and base frame (530), respectively. Lift arm (522) and base frame (530) may be substantially similar to lift arm (22) and base frame (30) described above, with differences elaborated below. Therefore, it should be understood that lift arm (522) and base frame (530) may be readily incorporated into two-post lift (10) in replacement of lift arm (22) and base frame (30) described above, respectively. It should also be understood that pivot restraint mechanism (570) may also be incorporated into two-post lift (10) in association with both lift arm (522) and base frame (530).

As will be described in greater detail below, pivot restraint mechanism (570) is capable of selectively restraining the rotational position of lift arm (522) relative to base frame (530) about pivot axis (PA1) such that lift arm (522) may be pivoted to a suitable position for engaging a structural lifting point of a vehicle's frame. As will also be described in greater detail below, bodies (572, 580) of pivot restraint mechanism (570) (A) are housed between respective upper and lower flanges (534) defining upper and lower pin holes (536), (B) are also housed between respective upper and lower arm flanges (523) of lift arm (522), and (C) substantially maintain their rotational position relative to their respective components via engagement with surfaces (521, 538) located between upper and lower flanges (534) defining upper and lower pin holes (536); either, some, or all of which may result in a compact pivot restraint mechanism (570), protection from objects in the environment, and/or effective support of lift arms (522). Additionally, pivot restraint mechanism (570) includes features that increase the amount of lateral force imparted on lift arm (522) without damaging pivot restraint mechanism (570), as compared to previous pivot restraint mechanisms.

Figure 3:
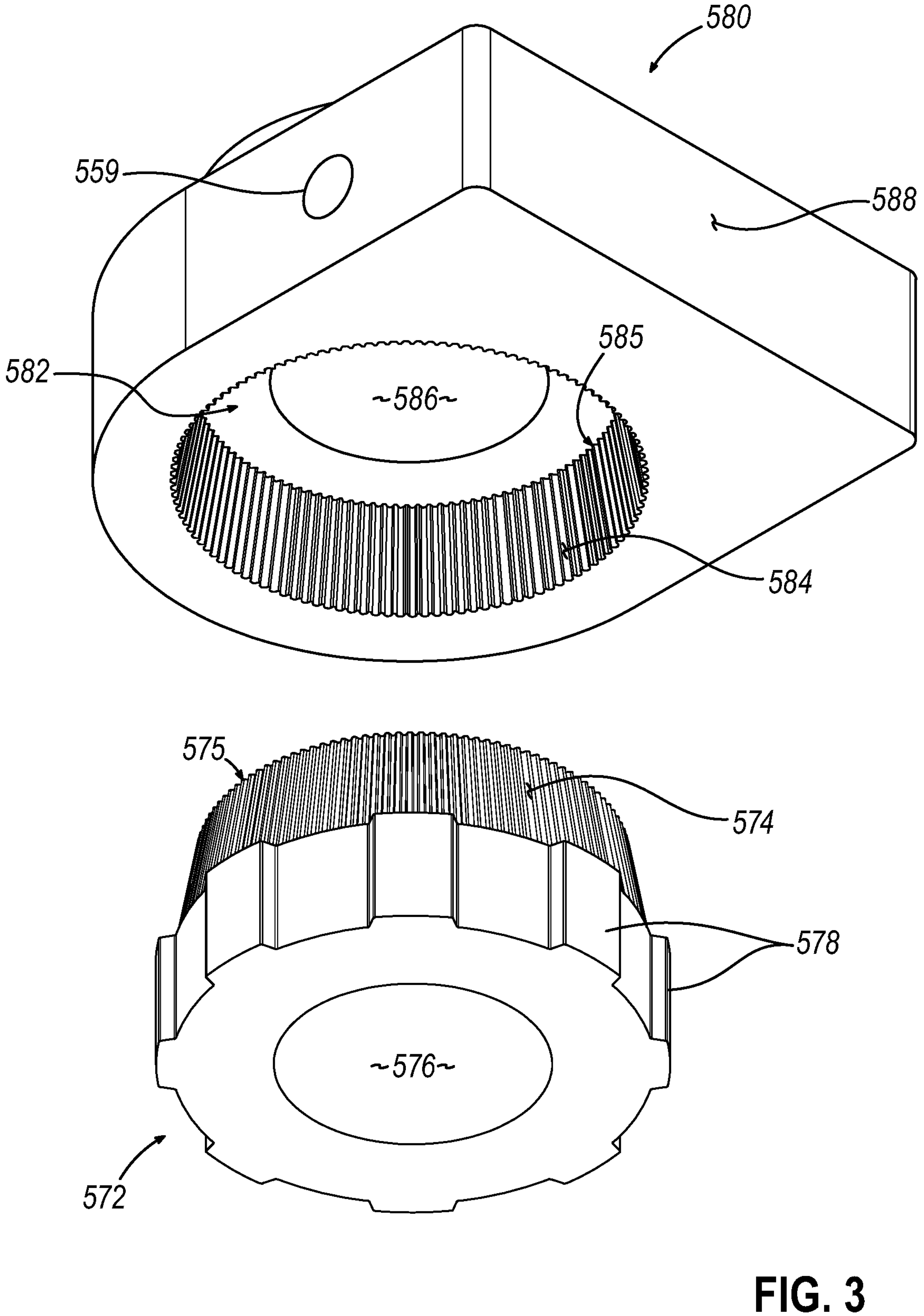
FIG. 3 is an exploded perspective view of an arm restraint body and a base frame restraint body of the pivot restraint mechanism of FIG. 2.
Figure 4:
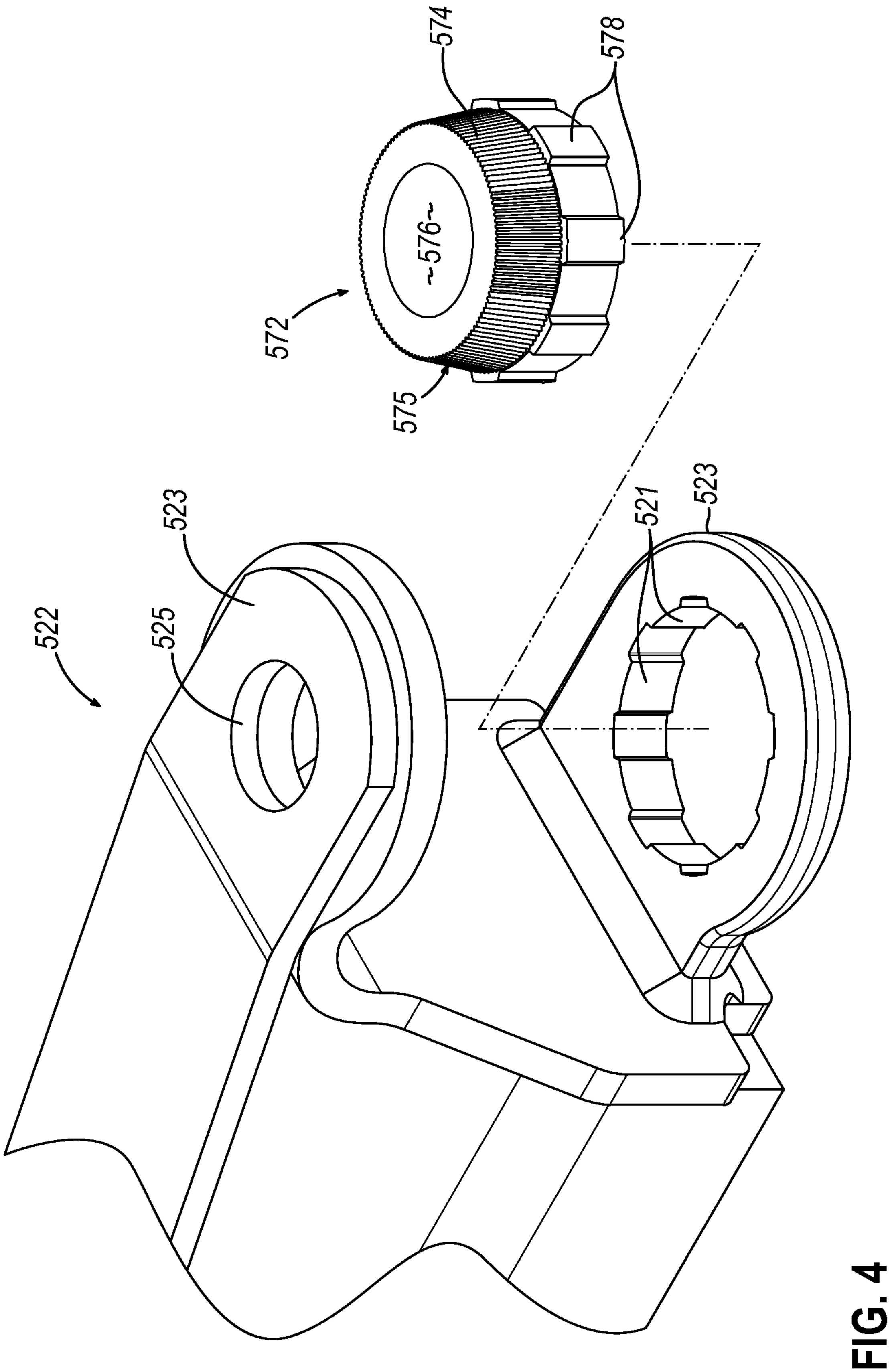
FIG. 4 is an exploded perspective view of the arm restraint body of FIG. 3 and the adjustable lift arm of FIG. 2.

As best shown in FIGS. 3-4, arm restraint body (572) includes a tapered external surface (574), a circumferential array of teeth or splines (575) extending along tapered external surface (574), and a series of rotational stopping splines (578) located below tapered external surface (574) and extending radially beyond tapered external surface (574). Arm restraint body (572) defines a through hole (576) dimensioned to receive pin (532). Therefore, as shown in FIGS. 7A-7D, once assembled, arm restraint body (572) is pivotally associated with pin (532) such that arm restraint body (572) may rotate about pivot axis (PA1) defined by pin (532).

Figure 5A:
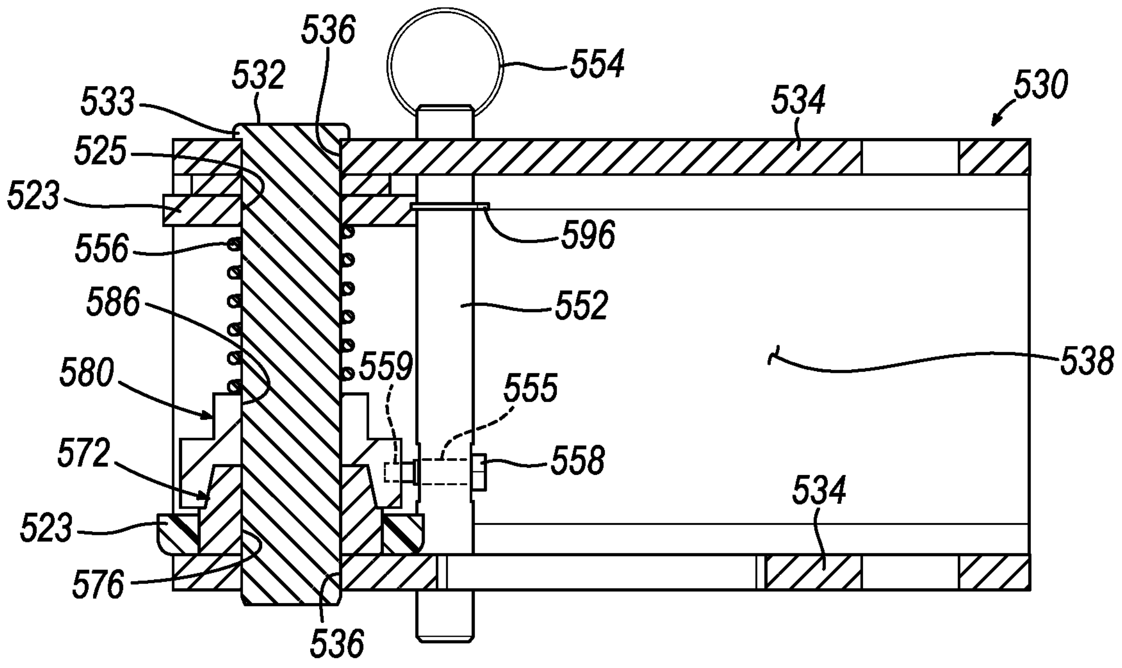
FIG. 5A is a cross-sectional view of the pivot restraint mechanism of FIG. 2 in a restrained configuration.
Figure 5B:
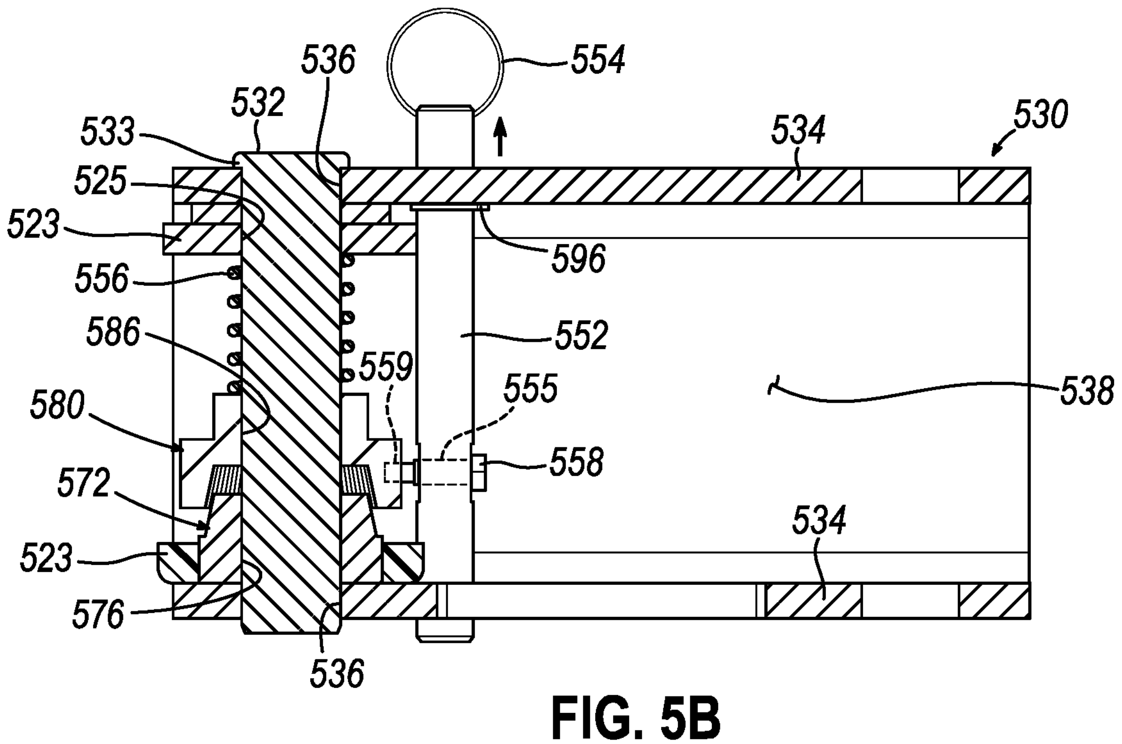
FIG. 5B is a cross-sectional view of the pivot restraint mechanism of FIG. 2 in an unrestrained configuration.

Additionally, rotational stopping splines (578) of arm restraint body (572) are housed within an opening of lower arm flange (523) defined by a rotational stopping surface (521). As shown in FIGS. 5A-5B, the portion of arm restraint body (572) housed within opening of lower arm flange (523) rests on top of a lower flange (534) of base frame (530). Such a coupling can contribute to the compact nature of pivot restraint mechanism (570).

While in the current example through hole (576) is defined by a portion of arm restraint body (572) extending to form a continuous annular surface, this is merely optional. In some instances, the portion of arm restraint body (572) defining through hole (576) is not continuous, but merely sufficient to rotationally couple arm restraint body (572) with pin (532) such that arm restraint body (572) does not disassociate from pin (532) after assembly.

Tapered external surface (574) is dimensioned to be received within a cavity (582) defined by base frame restraint body (580) such that external surface (574) may be directly adjacent to at least a portion of an internal surface (584) of base frame restraint body (580). As will be described in greater detail below, tapered external surface (574) and/or splines (575) extending along surface (574) may be configured to suitably engage a portion of base frame restraint body (580) in order to rotationally restrain bodies (572, 580) when bodies (572, 580) are in the restrained configuration.

As best seen in FIG. 4, rotational stopping splines (578) are dimensioned to abut against a corresponding rotational stopping surface (521) of lift arm (522) once assembled. In the current example, surface (521) defines a plurality of recesses, with each recess dimensioned to house an individual spline (578), respectively. This type of arm lug with a splined connection may allow for an arm restraint body (572) and lift arm (522) to be easily attached during assembly of a lift, as well as an economically efficient manner of manufacturing both lift arm (522) and arm restraint body (572). For instance, during assembly of arm restraint body (572) onto lift arm (522), arm restraint body (572) may be merely inserted into an opening defined by lower flanges (523) such that splines (578) suitably engage surface (521). Interaction between rotational stopping surfaces (578, 521) prevents arm restraint body (572) from rotating about pin (532) relative to lift arm (522). If lift arm (522) rotates relative to base frame (530) in accordance with the description herein, arm restraint body (572) will also rotate with lift arm (522) relative to base frame (530) due to the interaction between rotational stopping surfaces (578, 521). Once assembled, splines (578) and surface (521) remain suitably engaged with each other.

In the current example, rotational stopping surfaces (578, 521) are substantially vertical with large complementary splines. However, this is merely optional, as stopping surfaces (578, 521) may have any suitable geometry as would be apparent to one skilled in the art in view of the teachings herein. In some instances, rotational stopping surface (578, 521) may be a key and keyhole configuration with a single spline and a single slot. In some instances, rotationally stopping surfaces (578, 571) may be complementary, but irregular shapes that interact with each other to inhibit rotation of arm restraint body (572) relative to base frame (530). In some instances, rotational stopping surfaces (578, 521) may be tapered such that arm restraint body (572) rests within and is vertically supported by lower flange (523) while still being rotationally fixed.

Lower flange (523) of lift arm (522) acts as a connecting bracket between lift arm (522) and arm restraint body (572) such that flanges (523) form a U-shaped yoke end that may assist in rotationally coupling lift arm (522) with base frame (530) via pin (532). Therefore, rotational stopping surface (578) of arm restraint body (572) engages a surface (521) of lift arm (522) that is located within lower flange (523) in order to rotationally fix arm restraint body (572) with lift arm (522). In the current example, rotational stopping surface (521) of lift arm (522) defines an opening that houses the rotational stopping splines (578) of arm restraint body (572). As shown in FIGS. 5A-5B, rotational stopping surface (578) of arm restraint body (572) may rest within the opening defined by lower flange (523) while being vertically supported (resting on) an upper surface of lower flange (534), or it may be adhered or welded to flange (523). While rotational stopping surface (578) of arm restraint body (572) is housed within lower flange (523) of lift arm (522), tapered external surface (574) extends above lower flange (523) of lift arm (520) such that tapered external surface (574), as well as base frame restraint body (580), are located between upper and lower flanges (523) of lift arm (522). As mentioned above, such a configuration may enhance the compact nature of pivot restraint mechanisms (570). Further, increasing the compact nature of pivot restraint mechanism (570) may allow features of lift arm (522) and base frame (530) to be formed with larger dimensions, thereby increasing the robustness of lift arm (522) to suitably transmit larger rotational loads onto base frame (530) without undesirably damaging components.

Turning back to FIG. 3, base frame restraint body (580) includes tapered internal surface (584), a circumferential array of teeth or splines (585) extending along a length of internal surface (584), and a rotational stopping surface (588). Base frame restraint body (580) defines a through hole (586) dimensioned to receive pin (532) and defines a recessed opening (559) dimensioned to receive a coupler (558) (see FIGS. 5A-5B). Therefore, as shown in FIGS. 5A-7D, once assembled, base frame restraint body (580) is associated with pin (532). Additionally, base frame restraint body (580) is coupled with pin (532) such that restraint body (580) is housed between flanges (534) defining pin holes (536) and flanges (523) of lift arm (522), which may contribute to the compact nature of pivot restraint mechanism (570). While in the current example, through hole (586) is defined by a portion of base frame restraint body (580) extending to form a continuous annular surface, this is merely optional. In some instances, the portion of base frame restraint body (580) defining through hole (586) is not continuous, but merely sufficient to rotationally couple base frame restraint body (580) with pin (532) such that base frame restraint body (580) does not disassociate from pin (532) after assembly.

Turning back to FIG. 3, internal surface (584) defines a cavity (582) dimensioned to house a portion of external surface (574) of arm restraint body (572) such that surface (574) may be directly adjacent to at least a portion of an internal surface (584) of base frame restraint body (580). Base frame restraint body (580) may be configured to vertically actuate along pin (532) about pivot axis (PA1) in order to selectively disengage and engage arm restraint body (572).

Splines (575, 585) complement each other such that when external surface (574) and internal surface (584) are directly adjacent to each other, splines (575, 585) engage to rotationally restrain bodies (572, 580) relative to each other about pivot axis (PA1). The tapered nature of surfaces (574, 584) may promote efficient meshing and un-meshing of splines (575, 585). While splines (575, 585) are used in the current example, any other suitable structure may be used in order to inhibit rotation of bodies (572, 580) relative to each other about pivot axis (PA1) of pin (532). For instance, in some examples, splines (575, 585) may be completely omitted such that the frictional braking force provided by contact between surfaces (574, 584) is sufficient to suitably inhibit rotation of bodies (572, 580) relative to each other such that lift arm (522) remains in a suitable rotational position relative to base frame (530) during illustrative use. In such instances, surfaces (574, 584) may include friction enhancing properties, such as roughened surfaces to promote a higher static coefficient of friction. In other instances, splines (575, 585) may be replaced with a plurality of complementary teeth configured to engage each other to inhibit rotation of bodies (572, 580) relative to each other.

It should be understood that with splines (575, 585) (or any other suitable anti-rotational feature) extending substantially around the full circumference of pin (532), pivot restraint mechanism (570) is able to withstand a significant increase in torque (598) (see FIG. 6) as compared to pivot restraint mechanisms (570) that only have splines (or any other suitable anti-rotational feature) extending along minor sectors or other sectors that do not extend substantially around a full circumference. In other words, the circumferential nature of splines (575, 585) (or any other suitable anti-rotational feature) may allow an increased amount of torque (598) to be transferred from lift arm restraint body (572) onto base frame restraint body (580) without damaging components of pivot restraint mechanisms (570).

Rotational stopping surface (588) is dimensioned to abut against a corresponding rotational stopping surface (538) (see FIG. 6) of base frame (530) once assembled. Interaction between rotational stopping surfaces (588, 538) prevents base frame restraint body (580) from rotating about pin (532) relative to base frame (530). Engagement between rotational stopping surfaces (588, 538) allows torque (598) to be transmitted from base frame restraint body (580) onto base frame (530), which may allow an increased amount of torque (598) to be transferred from lift arm (522) without damaging components of pivot restraint mechanism (570). While rotation stopping surfaces (588, 538) suitably engage each other to inhibit rotation of restraint body (580) with base frame (530), restraint body (580) may suitably actuate along a length of pin (532) relative to base frame (530) in order to transition between engagement and disengagement with arm restraint body (572) in accordance with the description herein. Rotational stopping surface (538) of base frame (530) acts as a connecting bracket between flanges (534) defining pin holes (536) such that rotational stopping surface (538) and flanges (534) form a U-shaped yoke end that may assist in rotationally coupling lift arm (522) with base frame (530) via pin (532). Therefore, rotational stopping surface (588) of base frame restraint body (580) engages surface (538) of base frame (530) that is located between flanges (534) in order to rotationally fix arm restraint body (580) with base frame (530).

Rotational stopping surface (588) acts as a web between flanges (534) such that rotational stopping surface (588) extends laterally between flanges (534) and defines a first pair of pin holes (536) and a second set of pin holes (536), each set configured to rotationally couple to a respective lift arm (522). In other words, rotational stopping surface (588) extends laterally to associate with two lift arms (522). The same stopping surface (588) engages a first base frame restraint body (580) of a first lift arm (522) and a second base frame restraint body (580) of a second lift arm (522). Additionally, since rotational stopping surface (588) acts as the connecting web between upper and lower flanges (534) to form a yoke, rotational stopping surface (588) faces inwards toward the area of lift (10) configured to receive a vehicle to be lifted. Having rotational stopping surface (588) act as the laterally connecting web that forms a yoke structure configured to rotationally support two lift arms (522) may allow for a simpler design of base frame (530), as compared to adding support gussets to base frame (530) to act as rotational stopping surfaces.

If lift arm (522) rotates relative to base frame (530) in accordance with the description herein, base frame restraint body (580) will remain rotationally fixed about pivot axis (PA1) relative to base frame (530) due to the interaction between rotational stopping surfaces (588, 538).

Therefore, restraint body (580) may be rotationally fixed relative to base frame (530) about the pivot axis (PA1) of pin (532) during assembly so long as rotational stopping surfaces (588,538) are suitably aligned when pin (532) is inserted through pin holes (525, 536) and through hole (586) during assembly. In the current example, rotational stopping surfaces (538, 588) are substantially flat and planar. However, this is merely optional, as rotation stopping surfaces (538, 588) may have any suitable geometry as would be apparent to one skilled in the art in view of the teachings herein. In some instances, there may be more than one pair of rotation stopping surfaces (538, 588) configured to rotationally fix base frame (530) with restraint body (580).

Figure 2:
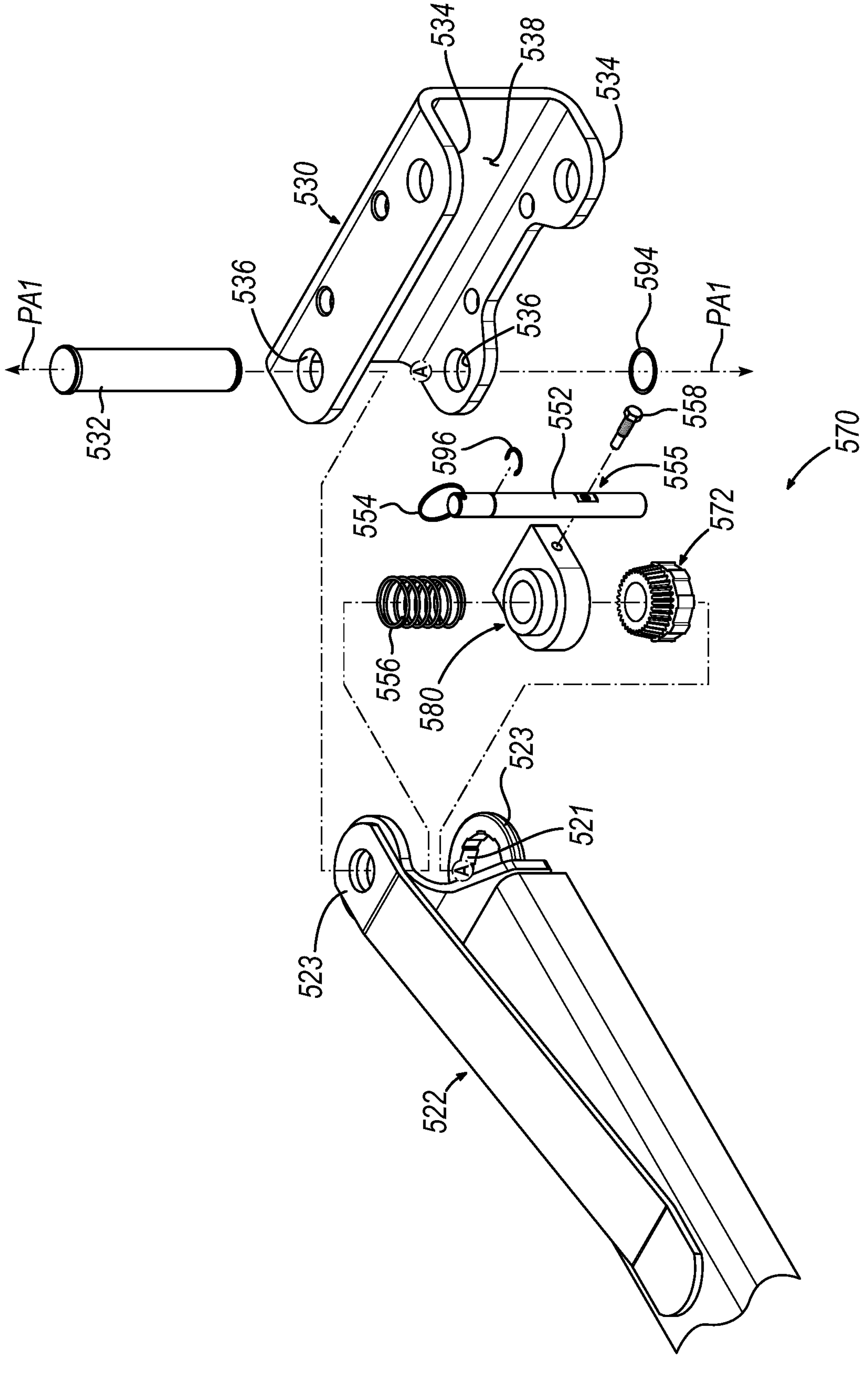
FIG. 2 is an exploded perspective view of a base frame, an adjustable lift arm, and a pivot restraint mechanism of the two-post lift assembly of FIG. 1A.

As best seen in FIGS. 2 and 5A-5B, pivot restraint mechanism (570) also includes a translating pin (552), a pull ring (554), and a bias spring (596). Translating pin (552) is slidably coupled to flanges (534) of base frame (530) via respective openings. In the current example, translating pin (552) is attached to base frame restraint body (580) via a coupler (558) that extends thorough a transverse through hole (555) defined by translating pin (552) and into recessed opening (559) defined by base frame restraint body (580). Translating pin (552) is suitably attached to base frame restraint body (580) such that vertical actuation of translating pin (552) relative to base frame (530) drives corresponding vertical actuation of base frame restraint body (580). Pull ring (554) is suitably attached to an upper side of translating pin (552) such that an operator may utilize pull ring (554) to lift translating pin (552) upwards relative to base frame (530). Therefore, as will be described in greater detail below, a user may utilize translating pin (552) and pull ring (544) to drive base frame restraint body (580) between the restrained and unrestrained configuration.

As best shown in FIGS. 5A-5B, pivot pin (532) is inserted within the confines of bias spring (556) such that bias spring (556) extends coaxially with pivot pin (532) about pivot axis (PA1). Bias spring (556) is interposed between upper flange (523) of lift arm (522) and a top surface of base frame restraint body (580). Bias spring (556) directly contacts and imparts a downward bias onto base frame restraint body (580) such that splines (575, 585) are biased into engagement with each other. Therefore, bias spring (556) biases restraint mechanism (570) into the restrained configuration. Since bias spring (556) is disposed around pivot pin (532), bias spring (556) may impart an even bias force onto the top surface of base frame restraint body (580), thereby promoting even and reliable engagement between splines (575, 585) in the locked configuration. With even and reliable engagement between splines (575, 585) (or any other suitable anti-rotational feature), pivot restraint mechanism (570) may effectively inhibit rotation of lift arm (522) in response to lateral loads without damage to pivot restraint mechanism (570).

Pin clip (596) is disposed on a portion of translating pin (552) located between flanges (534) of base frame (530). Pin clip (596) is attached to translating pin (552) and is configured to prevent translating pin (552) from being accidentally removed from base frame (530). In particular, as shown in FIG. 5B, pin clip (596) may engage the underside of flange (534) after pivot restraint mechanism (570) reaches the unrestrained position.

Retaining ring (594) is configured to inhibit pin (532) from inadvertently disassociating with base frame (530). In particular, retaining ring (594) is coupled to an underside of pin (532) to thereby prevent pin (532) from being pulled upwardly out of engagement with flanges (534). Retaining ring (594) may be installed without the use of any additional tools. Pin (332) also includes a head (533) located at the top which prevents pin (532) from falling through flanges (534) of base frame (530). Therefore, in the current example, retaining ring (594) and head (533) cooperate to keep pin (532) coupled with base frame (530).

FIGS. 5A-5B show an illustrative use of restraint mechanism (570) to transition restraint mechanism (570) from a restrained configuration to an unrestrained configuration. FIG. 5A shows restraint mechanism (570) in a restrained configuration where frame restraint body (580) is suitably engaged with arm restraint body (572) to restrict rotation of lift arm. In the restrained configuration, bias spring (556) biases frame restraint body (580) into suitable engagement with arm restraint body (572). As mentioned above, translating pin (552), coupler (558), and frame restraint body (580) are coupled together such that each of these components is biased toward the restrained configuration shown in FIG. 5A. While in the restrained configuration, restraint mechanism (570) may inhibit rotation of lift arm (522) relative to base frame (530) in accordance with the description herein.

As shown in FIG. 5B, an operator may transition restraint mechanism (570) from the restrained configuration to the unrestrained configuration by applying an upward force on pull ring (554) to thereby lift translating pin (552), coupler (558), and frame restraint body (580) such that frame restraint body (580) disengages suitable components of arm restraint body (572). The upward force applied to pull ring (554) is greater than the downward force applied by bias spring (556), which may cause frame restraint body (580) to compress bias spring (556) to thereby cause frame restraint body (580) to move upward relative to arm restraint body (572). In some instances, translating pin (552) is lifted to a position where pin clip (596) contacts upper flange (534) such that pin clip (596) inhibits translating pin (552) from disassociating with base frame (530). In the unrestrained configuration shown in FIG. 5B, frame restraint body (580) is sufficiently removed from arm restraint body (572) such that lift arm (522) is capable of rotating about pin (532) relative to base frame (530).

If an operator desires to rotationally fix lift arm (522) relative to base frame (530), the operator may simply release pull ring (554), thereby allowing bias spring (556) to drive frame restraint body (580) back into engagement with arm restraint body (572) in accordance with the description herein. Transitioning from the unrestrained configuration to the restrained configuration is the reverse, where the force from bias spring (556) is greater than the force applied at pull ring (554) such that frame restraint body (580) is driven to engage with arm restraint body (572).

In some instances, pin (532) may be coupled to frame restraint body (580) such that pin (532) may move vertically relative to base frame (520) to transition between the restrained and unrestrained configurations.

Figure 6:
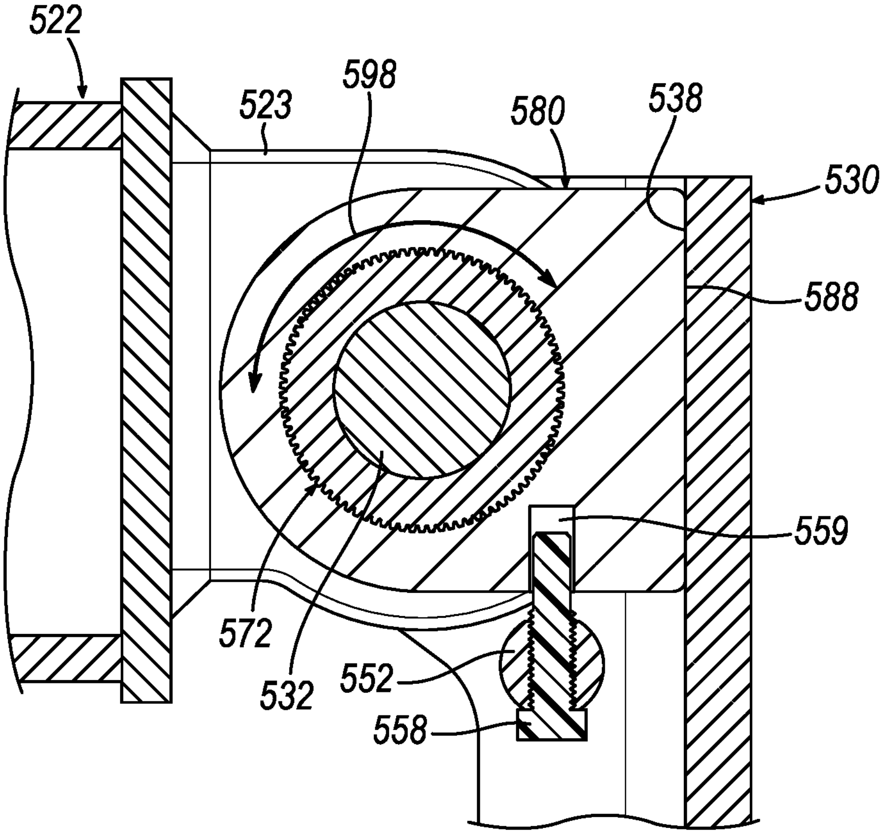
FIG. 6 is a cross-sectional view of the pivot restraint mechanism of FIG. 2, with the pivot restraint mechanism of FIG. 2 in the restrained configuration.

FIG. 6 shows a horizontal cross-sectioned portion of restraint mechanism (570) shown in FIG. 5A. Frame restraint body (580) can be seen engaged with arm restraint body (572) such that restraint mechanism (570) is in the restrained configuration. In the current embodiment, coupler (558) is shown as a screw having a threaded portion being threaded into translating pin (552) and a cylindrical pin portion being captured within a recessed opening (559) of frame restraint body (580). Coupler (558) may further include a screw head configured to contact and tighten against translating pin (552) when coupler (558) is appropriately positioned to lift frame restraint body (580). In alternative embodiments, coupler (558) may be a press fit pin, a rolled pin, or any other linkage as would be apparent to someone skilled in the art in view of the teachings herein.

As mentioned above, pivot restraint mechanism (570) may inhibit rotation of lift arm (522) relative to base frame (530) in the restrained configuration. In such instances, as shown in FIG. 6, lift arm (522) may experience a lateral force generating a torque (598). Torque (598) may be transmitted from flange (523) of lift arm (522) onto arm restraint body (572) via rotational stopping surface (521) and splines (578). With restraint mechanism (570) in the restrained configuration, torque (598) may be transmitted from arm restraint body (572) onto frame restraint body (580) via splines (575, 585). It should be understood that with splines (575, 585) (or any other suitable anti-rotational feature) extending substantially around the full circumference of pin (532), pivot restraint mechanism (570) is able to withstand a significant increase in torque (598) (see FIG. 6) as compared to pivot restraint mechanisms (570) that only have splines (or any other suitable anti-rotational feature) extending along minor sectors or other sectors that do not extend substantially around a full circumference.

To counteract the generated torque (598) and thus prevent lift arm (522) from rotating about pin (532), frame restraint body (580) is positioned such that rotational stopping surface (588) of frame restraint body (580) contacts rotational stopping surface (538) of base frame (530) and thus prevents movement. Rotational stopping surfaces (538, 588) are positioned such that they are capable of preventing either or both clockwise and counterclockwise rotation of lift arm (522). In some instances, pin (532) is welded to base frame (530) and base frame restraint body (580) is configured to transmit torque (598) onto base frame (530) via pin (532).

Coupler (558) within recessed opening (559) may be loose enough, and/or rotational stopping surfaces (538, 588) may be sufficiently engaged with each other, that none or only a minimal amount of torque (598) is transmitted onto coupler (558) and translating pin (552), which may allow pivot restraint mechanism (570) to accommodate greater torque (598) without damaging translating pin (552). Therefore, pivot restraint mechanism (570) is configured to inhibit undesirable rotation of lift arm (522) relative to base frame (530) without transmitting any reactionary forces generated from torque (598) onto translating pin (552).

Figure 7A:
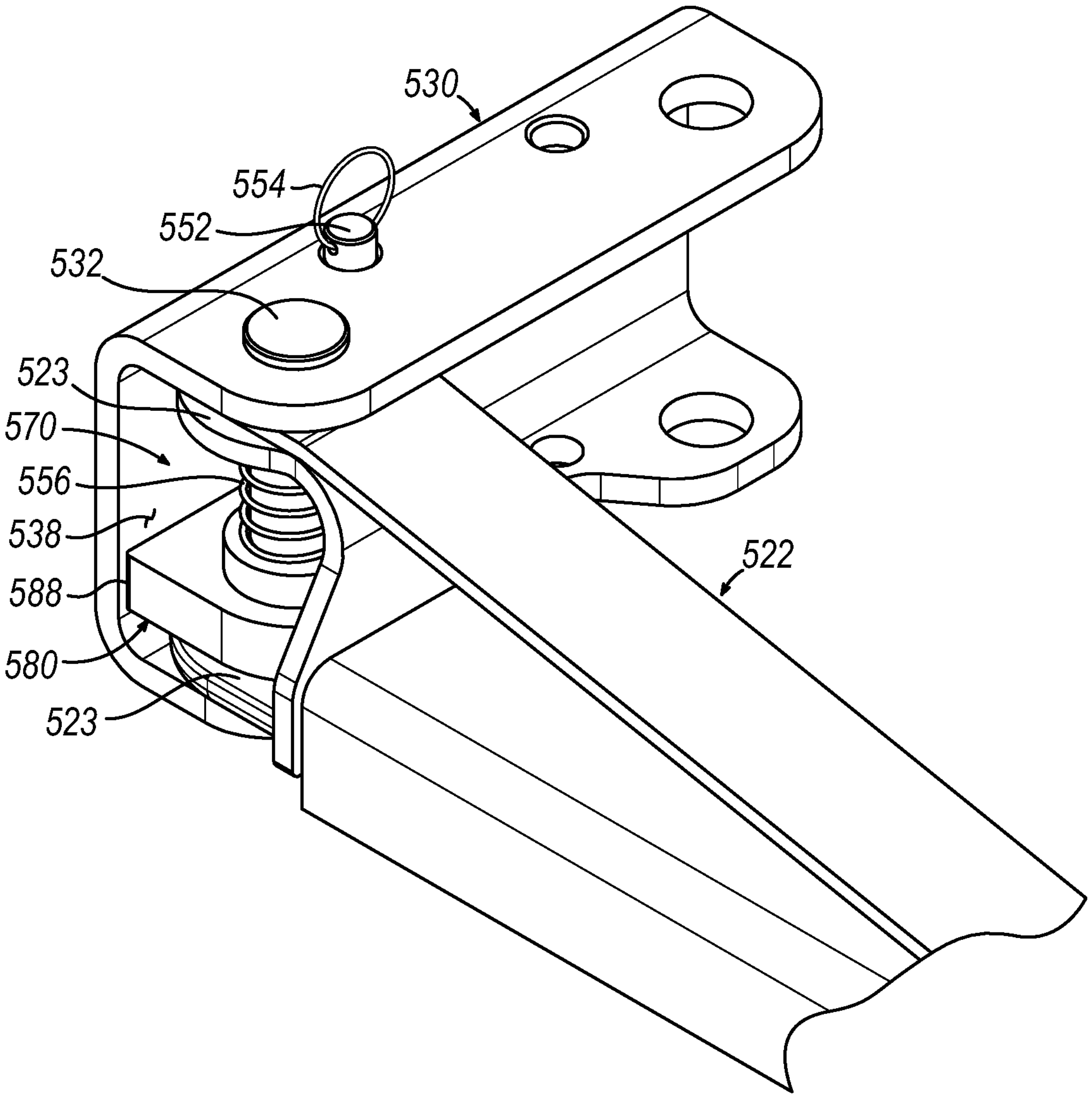
FIG. 7A is a perspective view of the adjustable lift arm of FIG. 2 in a first rotational position relative to the base frame of FIG. 2, with the pivot restraint mechanism of FIG. 2 in a restrained configuration.

FIGS. 7A-7D show an illustrative use of restraint mechanism (570) to pivot lift arm (522) relative to base frame (530) between two rotational positions. First, as shown in FIG. 7A, restraint mechanism (570) may be in the restrained configuration such that base frame restraint body (580) rests on top of arm restraint body (572). In the position shown in FIG. 7A, tapered internal surface (584) and tapered external surface (574) are directly adjacent to each other to thereby inhibit rotation of bodies (572, 580) relative to each other in accordance with the description herein. It should be understood that in examples where splines (575, 585) are incorporated, splines (575, 585) may be in suitable engagement to rotationally restrain bodies (572, 580) relative to each other.

Since rotation stopping surfaces (578, 521) are abutting against each other, and since rotation stopping surfaces (588, 538) are abutting against each other, arm restraint body (572) is rotationally fixed relative to lift arm (522), while frame restraint body (580) is rotationally fixed relative to base frame (530). Therefore, when bodies (572, 580) are in the restrained configuration shown in FIG. 7A, lift arm (522) may be inhibited from rotating about pivot axis (PA1) relative to base frame (530). The engagement between (A) rotation stopping surfaces (578, 521), (B) rotation stopping surfaces (588, 538), and (C) splines (575, 585) may further improve the strength of pivot restraint mechanism (570), enabling it to withstand large rotational loads acting on lift arms (522) while still inhibiting rotation of each lift arm (522) about respective pivot axis (PA1).

Figure 7B:
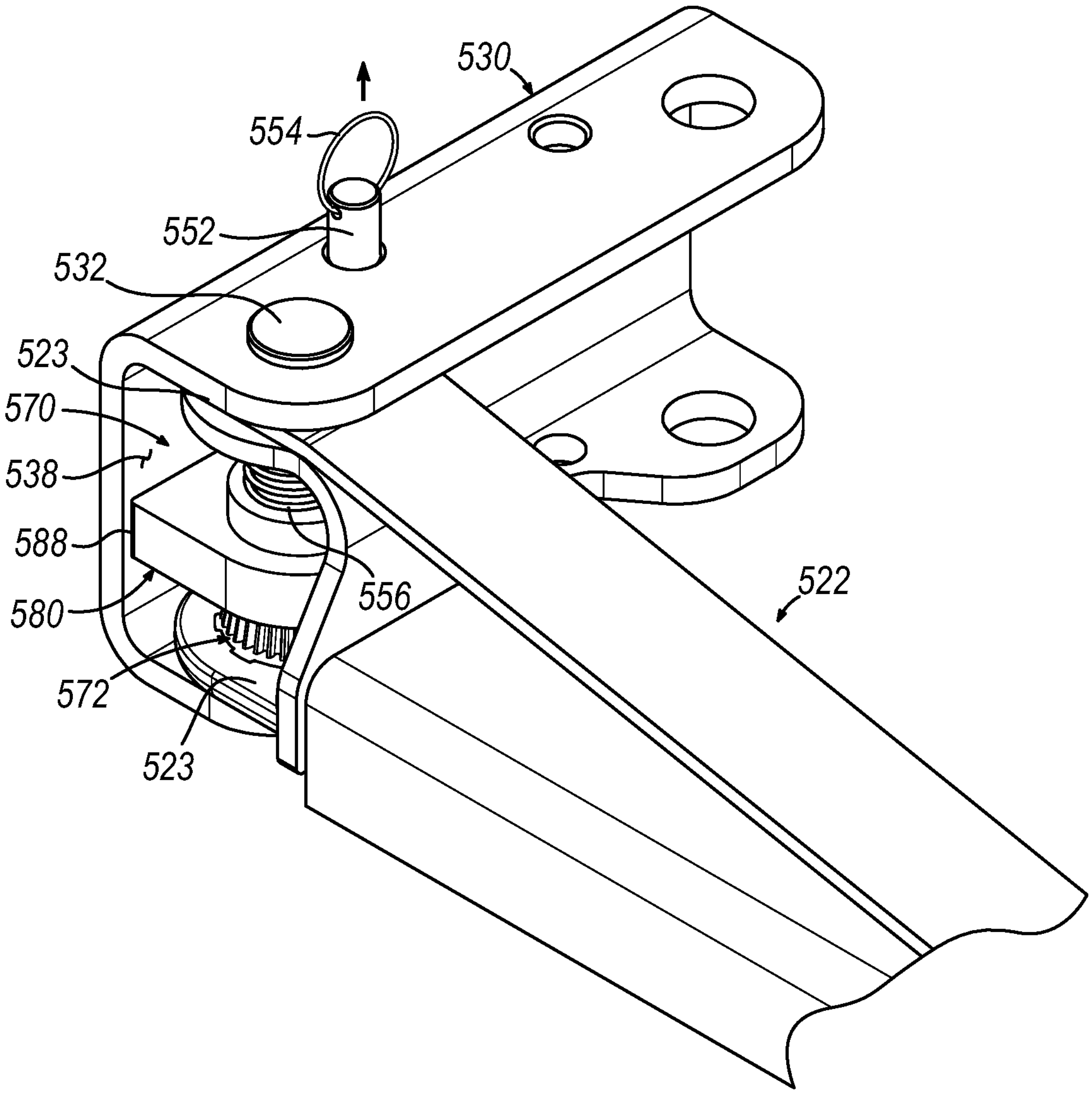
FIG. 7B is a perspective view of the adjustable lift arm of FIG. 2 in the first rotational position relative to the base frame of FIG. 2, with the pivot restraint mechanism of FIG. 2 in an unrestrained configuration.

If an operator desires to rotate lift arm (522), the operator may vertically actuate base frame restraint body (580) upward such that tapered surfaces (574, 584) are no longer directly adjacent to each other, thereby actuating restraint mechanism (570) into the unrestrained configuration, as shown between FIGS. 7A-7B. Therefore, in instances where splines (575, 585) are incorporated, splines (575, 585) are not engaged with each other while restraint mechanism (570) is in the unrestrained configuration. In instances where the frictional braking force between tapered surfaces (574, 584) inhibits rotation of arm (522) relative to base (530) utilizing other anti-rotational features, such anti-rotational features of tapered surfaces (574, 584) may no longer be engaged with each other.

Figure 7C:
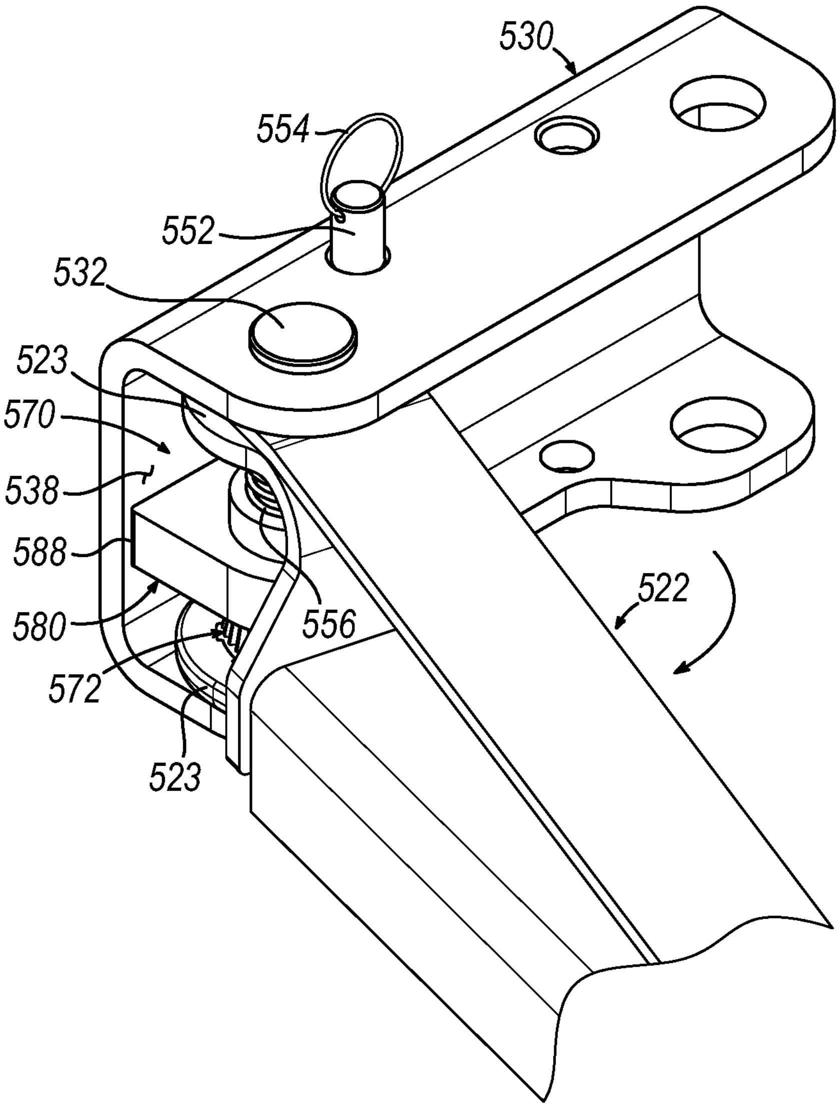
FIG. 7C is a perspective view of the adjustable lift arm of FIG. 2 in a second rotational position relative to the base frame of FIG. 2, with the pivot restraint mechanism of FIG. 2 in the unrestrained configuration.
Figure 7D:
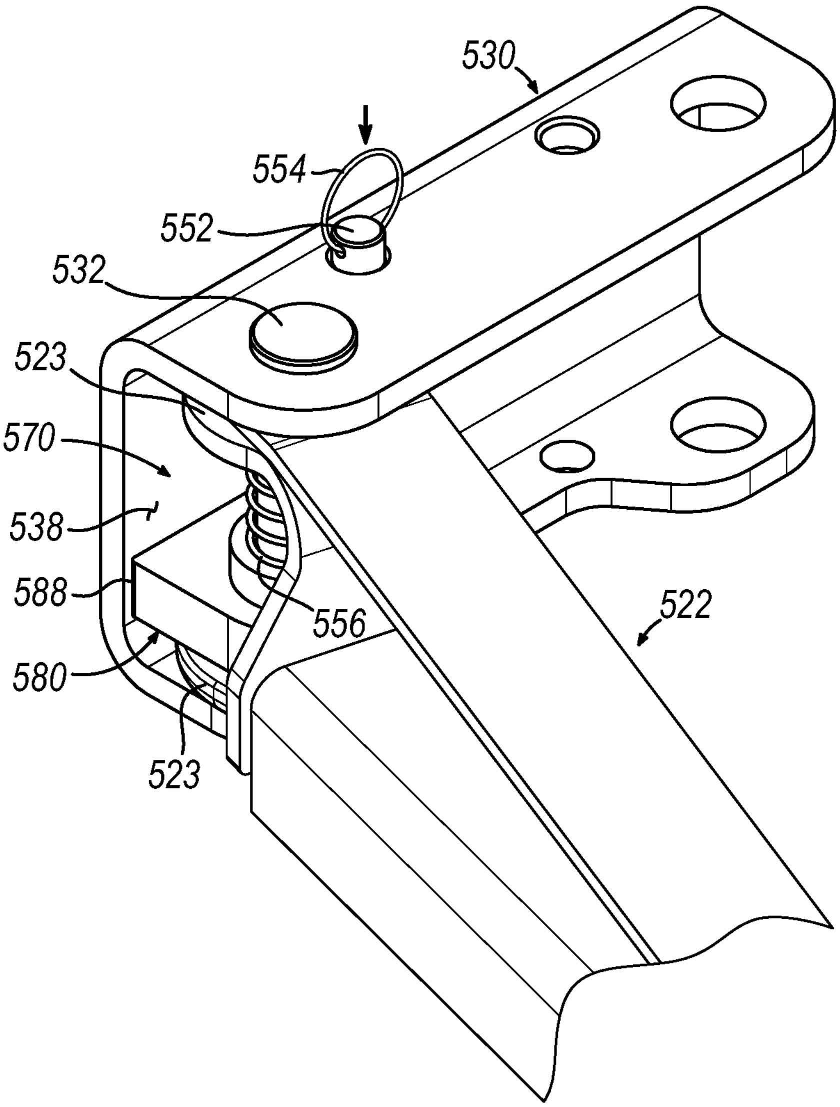
FIG. 7D is a perspective view of the adjustable lift arm of FIG. 2 in the second rotational position relative to the base frame of FIG. 2, with the pivot restraint mechanism of FIG. 2 in the restrained configuration.

As shown between FIGS. 7B-7C, with restraint mechanism in the unrestrained configuration, the operator may rotate arm (522) relative to base frame (530) about pivot axis (PA1) in order to position arm (522) into a suitable rotational position to engage a vehicle in accordance with the description herein. Next, as shown in FIG. 7D, the operator may actuate restraint body (580), or allow restraint body (580) to actuate, back into the restrained configuration in accordance with the description herein such that further rotation of lift arm (522) relative to base frame (530) is inhibited. Since pivot restraint mechanism (570) is housed between flanges (523, 534) defining pin holes (525, 536), pivot restraint mechanism (570) may be compactly stored, thereby reducing the chances of acting as an obstruction on the shop floor.

B. Second Illustrative Rotational Restraint Assembly

Figure 8:
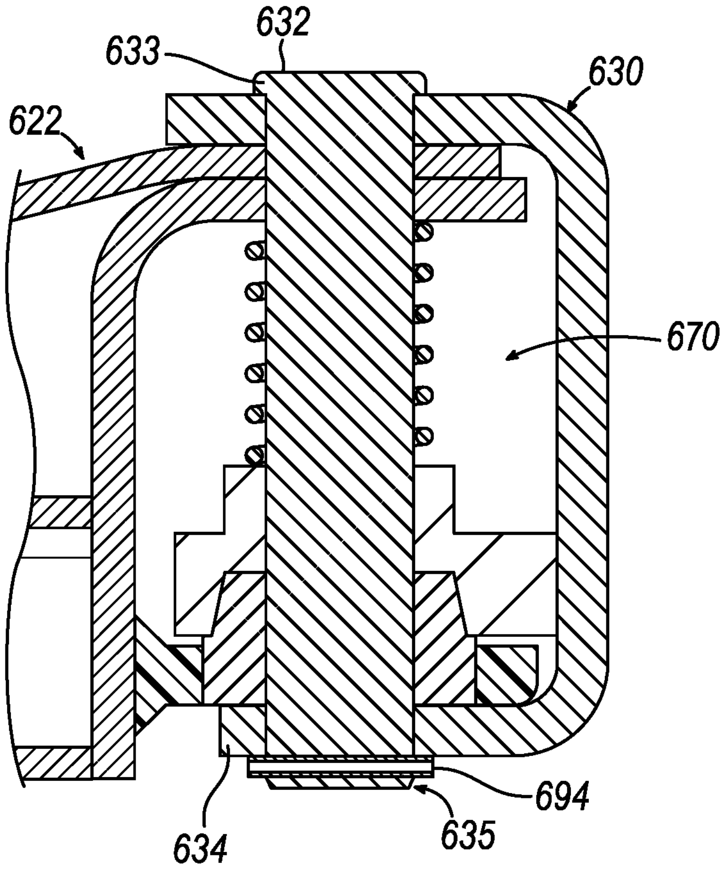
FIG. 8 is a cross-sectional view of an alternative pivot restraint mechanism with a pin having a retention pin.

FIG. 8 shows a cross-sectioned front view of an alternative pivot restraint mechanism (670) used to couple a lift arm (622) with a base frame (630). Lift arm (622), base frame (630), and pivot restraint mechanism (670) may be substantially similar to lift arm (522), base frame (530), and pivot restraint mechanism (570) described above, respectively, with differences elaborated below. Rather than vertically retaining pin (532) using retaining ring (594), the shown second illustrative pivot restraint mechanism (670) vertically retains pin (632) using retention pin (694) positioned below lower flange (634) of base frame (630). Retention pin (694) traverses a through hole (635) of pin (632) such that retention pin (694) can contact lower flange (634) of base frame (630) should pin (632) move upward. Retention pin (694) may be in the form of a press-fit pin, a cotter pin, a safety pin, or any other retainer as would be apparent to one skilled in the art in view of the teachings herein.

C. Third Illustrative Rotational Restraint Assembly

Figure 9:
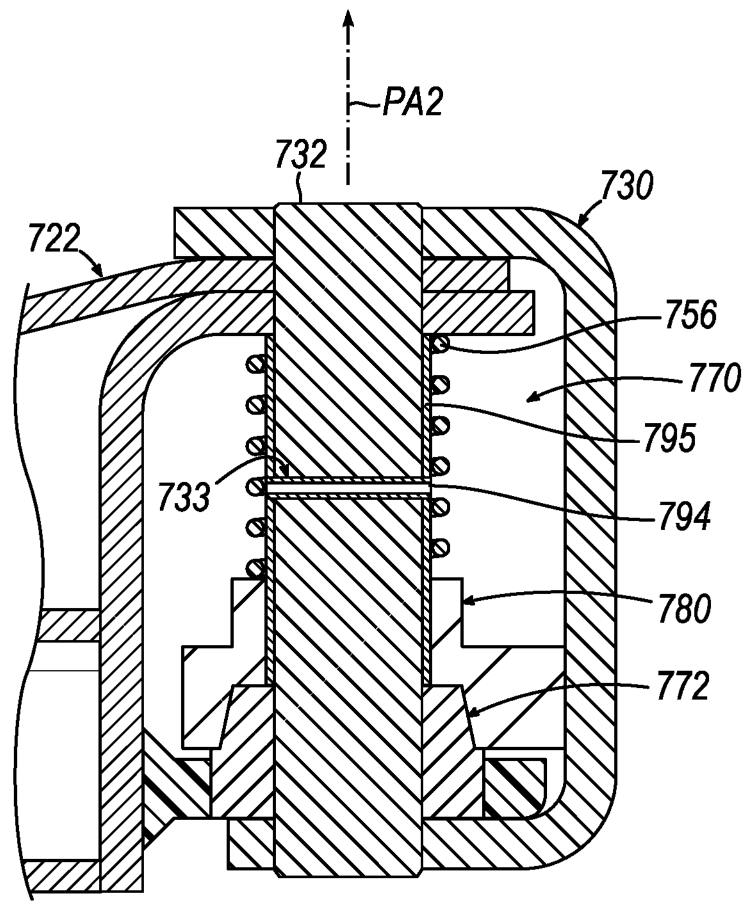
FIG. 9 is a cross-sectional view of another alternative pivot restraint mechanism with a pin having a retention pin within a base frame.
Figure 10:
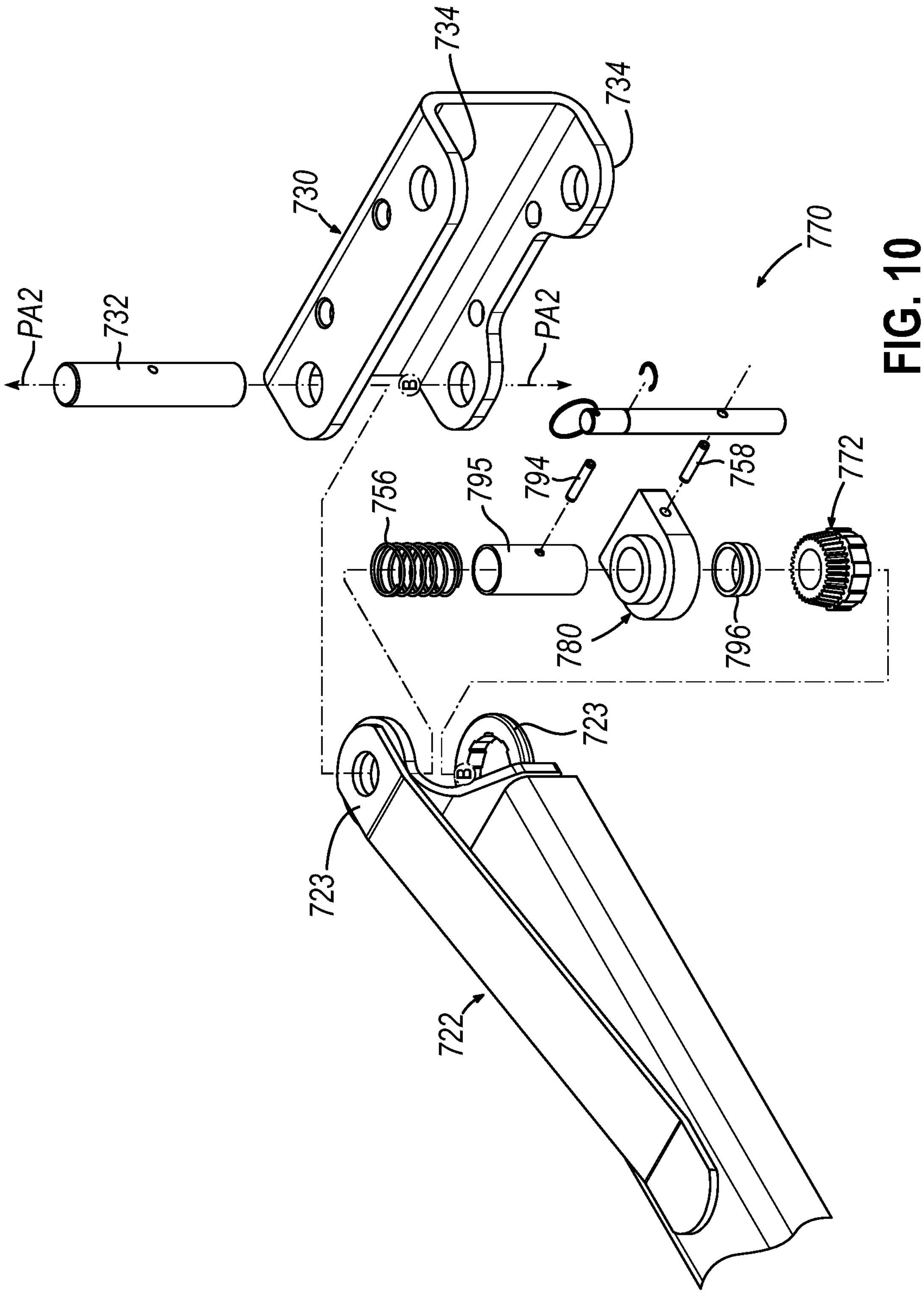
FIG. 10 is an exploded perspective view of the alternative pivot restraint mechanism of FIG. 9.
Figure 11:
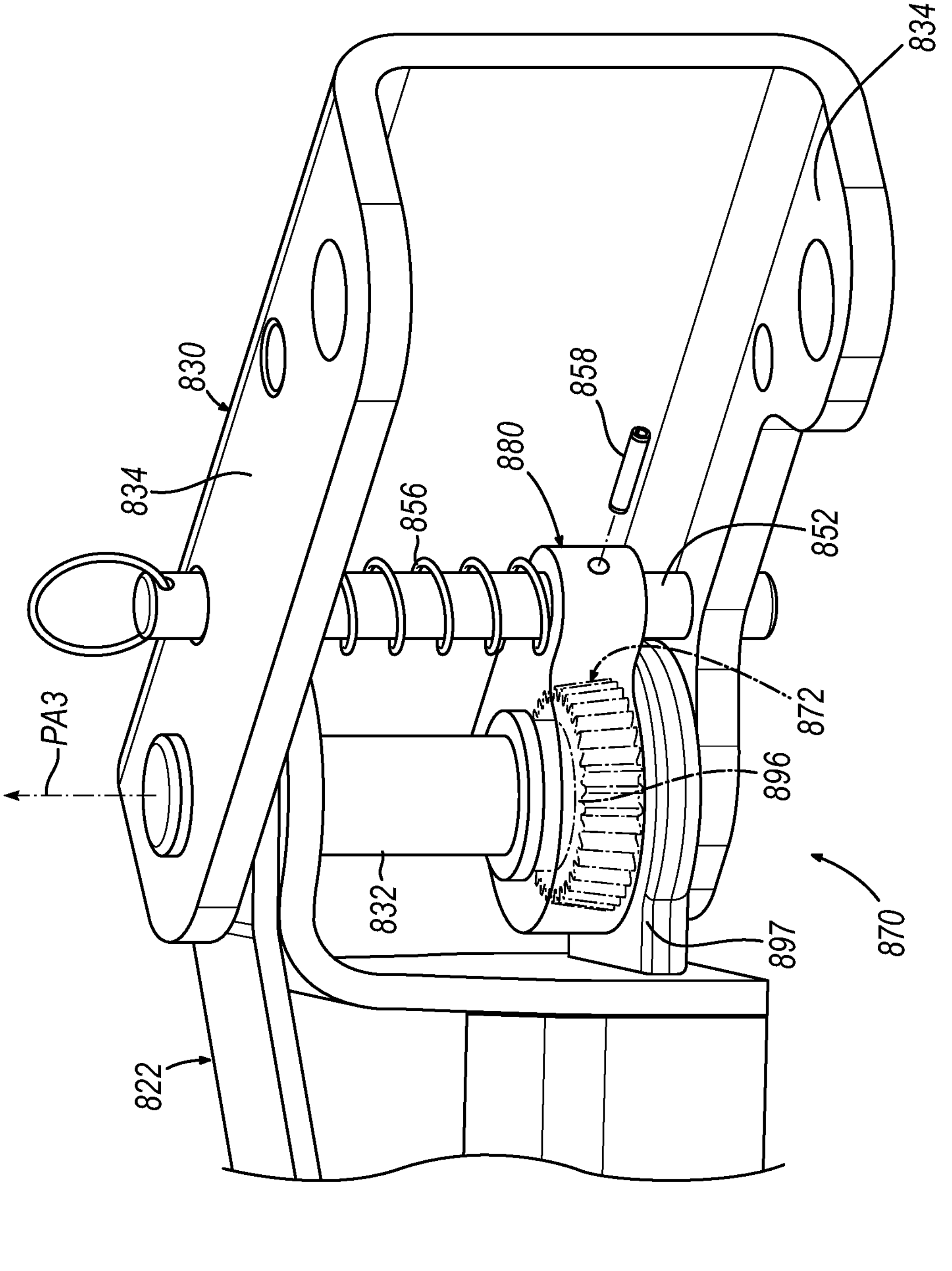
FIG. 11 is a perspective view of another alternative pivot restraint mechanism and an alternative lift arm, with the pivot restraint mechanism in a restrained configuration.

FIGS. 9 and 10 show another pivot restraint mechanism (770) used to couple a lift arm (722) with a base frame (730). Lift arm (722), base frame (730), and pivot restraint mechanism (770) may be substantially similar to lift arm (522), base frame (530), and pivot restraint mechanism (570) described above, respectively, with differences elaborated below. FIG. 9 shows a cross-sectioned front view of restraint mechanism (770) including a retention pin (794) running through a through hole (733) defined by a middle portion of a pin (732) and a pin sleeve (795). Therefore, retention pin (794) couples pin (732) with pin sleeve (795). Pin sleeve (795) is coaxial and along an outside perimeter of pin (732). Rather than pin (732) including an upper flange such as pin flange (633) of pin (632), retention pin (794) and pin sleeve (795) vertically support pin (732) within a base frame (730). By vertically supporting pin (732) within base frame (730), pin (732) can be positioned flush with both outer portions of base frame (730) or lift arm (722); as shown. Retention pin (794) is positioned substantially flush with outside surface of pin sleeve (795) such that a bias spring (756) is capable of suitable compressing to allow clearance between frame restraint body (780) and arm restraint body (772). Frame restraint body (780) is configured to vertically translate along pivot axis 2 (PA2) similar to frame restraint body (580) to thus transition restraint mechanism (770) between a restrained and an unrestrained configuration. Frame restraint body (780) is thus positioned over pin sleeve (795) to allow frame restraint body (780) to translate. As such, pin sleeve (795), and thus retention pin (794) and pin (732), are supported by a top surface of arm restraint body (772). Retention pin (794) may be sized to fit between two adjacent coils of bias spring (756) without retention pin (794) contacting the adjacent coils of bias spring (756). Retention pin (794) and pin sleeve (795) may be positioned anywhere along pin (732) such that they are capable of vertically supporting pin (732).

FIG. 10 shows an exploded view of restraint mechanism (770) of FIG. 9 along with a frame restraint body bushing (796). Assembly of restraint mechanism (770) may include coaxially orienting lift arm flanges (723), arm restraint body (772), frame restraint body bushing (796), frame restraint body (780), pin sleeve (795), and bias spring (756) relative to each other and between flanges (734) and base frame (730). Once retention pin (794) is positioned within pin (732) and pin sleeve (795), pin (732) may then be vertically supported to thus maintain the components of restraint mechanism (770). Translating pin (752) and coupler (758) may then be longitudinally coupled to frame restraint body (780) to thus transition restraint mechanism (770) between a restrained and an unrestrained configuration.

D. Fourth Illustrative Rotational Restraint Assembly

FIGS. 11-16B show another pivot restraint mechanism (870) used to couple a lift arm (822) with a base frame (830). Lift arm (822), base frame (830), and restraint mechanism (870) may be substantially similar to lift arm (522), base frame (530), and restraint mechanism (570), described above, with differences elaborated below. Therefore, components of pivot restraint mechanism (870) with similar names to components of pivot restraint mechanism (570) may be substantially similar to one another, with differences elaborated below.

Frame restraint body (880) includes a lateral coupling body (887) that extends to and circumferentially surrounds a portion of translating pin (852), while a coupler (858) may be positioned between translating pin (852) and frame restraint body (880) to thereby couple translating pin (852)

and frame restraint body (880). In other words, coupler (858) suitably attaches translating pin (852) to frame restraint body (880) such that vertical actuation of translating pin (852) drives vertical actuation of frame restraint body (880) in accordance with the description herein. Translating pin (852) and frame restraint body (880) may be suitably attached to each other via any other suitable means as would be apparent to one skilled in the art in view of the teachings herein. For example, translating pin (852) and frame restraint body (880) may be coupled together via a suitable adhesive, welding, press-fitting, etc.

Bias spring (856) is coaxially positioned over translating pin (852) rather than pin (832). Bias spring (856) is interposed between an upper flange (834) of base plate (830) and lateral coupling body (887) of frame restraint body (880), thereby biasing frame restraint body (880) downward.

Restraint mechanism (870) also includes restraint gear holder (897), which can act as a lower flange of lift arm (822). Therefore, it should be understood that restraint gear holder (897) may be substantially fixed to the rest of lift arm (822). Restraint gear holder (897) operates similarly to rotational stopping surfaces (521) of restraint mechanism (570) in that it is configured to rotationally restrict arm restraint body (872) about pivot axis (PA3). Restraint gear holder (897) includes rotational stopping surfaces (821) that can be shaped to complement the splines (878) of arm restraint body (872). Restraint gear holder (897) may be welded or bolted to lift arm (822) such that movement between the two is limited. Restraint gear holder (897) may be integrally formed with other suitable components of lift arm (822). Therefore, it should be understood that restraint gear holder (897) may be substantially fixed to the rest of lift arm (822) via any suitable means as would be apparent to one skilled in the art in view of the teachings herein.

Figure 12:
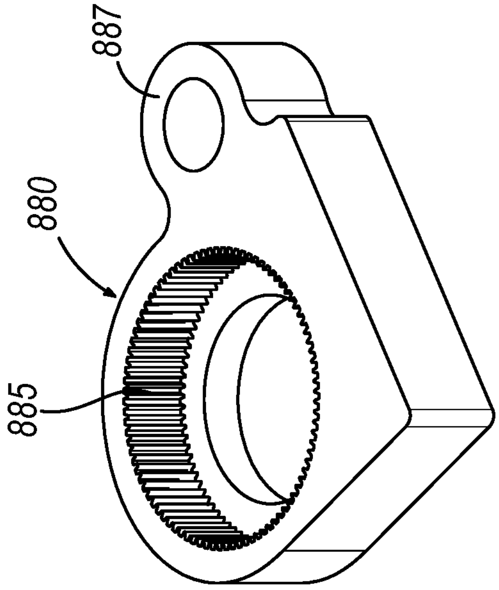
FIG. 12 is a perspective view of a frame restraint body of the alternative pivot restraint mechanism of FIG. 11.

FIGS. 12-15 each show perspective views of individual components of restraint mechanism (870). FIG. 12 shows frame restraint body (880) including an internal tapered surface having a set of splines (885) circumferentially positioned about the internal tapered surface. Frame restraint body (880) also includes lateral coupling portion (887) wherein translating pin (852) is positioned within lateral coupling portion (887) to therein drive translation of frame restraint body (880). Frame restraint body (880) may be coupled to translating pin (852) using a coupler (858). Frame restraint body (880) may be manufactured using powder metal or any other suitable material and/or techniques as would be apparent to one skilled in the art in view of the teachings herein.

Figure 13:
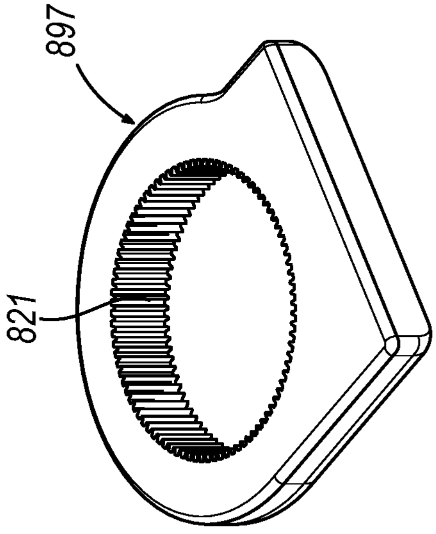
FIG. 13 is a perspective view of a restraint gear holder of the alternative pivot restraint mechanism of FIG. 11.

FIG. 13 shows restraint gear holder (897) which is positioned below frame restraint body (880) and can be rigidly attached to a portion of lift arm (822). Restraint gear holder (897) may be manufactured using forged steel and by broaching rotational stopping surfaces (821) into an inner surface. Of course, restraint gear (897) may be made with any other suitable material and/or techniques as would be apparent to one skilled in the art in view of the teachings herein.

Figure 14:
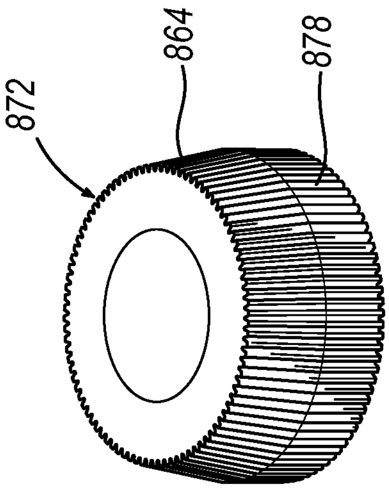
FIG. 14 is a perspective view of an arm restraint body of the alternative pivot restraint mechanism of FIG. 11.

FIG. 14 shows restraint arm restraint body (872) having tapered splines (864) that are each aligned with straight splines (878). Straight splines (878) are configured to couple with rotational stopping surfaces (821) of restraint gear holder (897). Tapered splines (864) are configured to couple with splines (885) of frame restraint body (880). Arm restraint body (872) may be manufactured out of powder metal or any other suitable material and/or techniques as would be apparent to one skilled in the art in view of the teachings herein.

Figure 15:
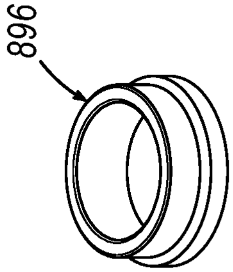
FIG. 15 is a perspective view of a bushing of the alternative pivot restraint mechanism of FIG. 11.

FIG. 15 shows bushing (896). Busing (896) may be positioned between arm restraint body (872) and frame restraint body (880) and may apply a pressure against pin (832). Bushing (896) may be made from steel or any other suitable material and/or techniques as would be apparent to one skilled in the art in view of the teachings herein.

Figure 16B:
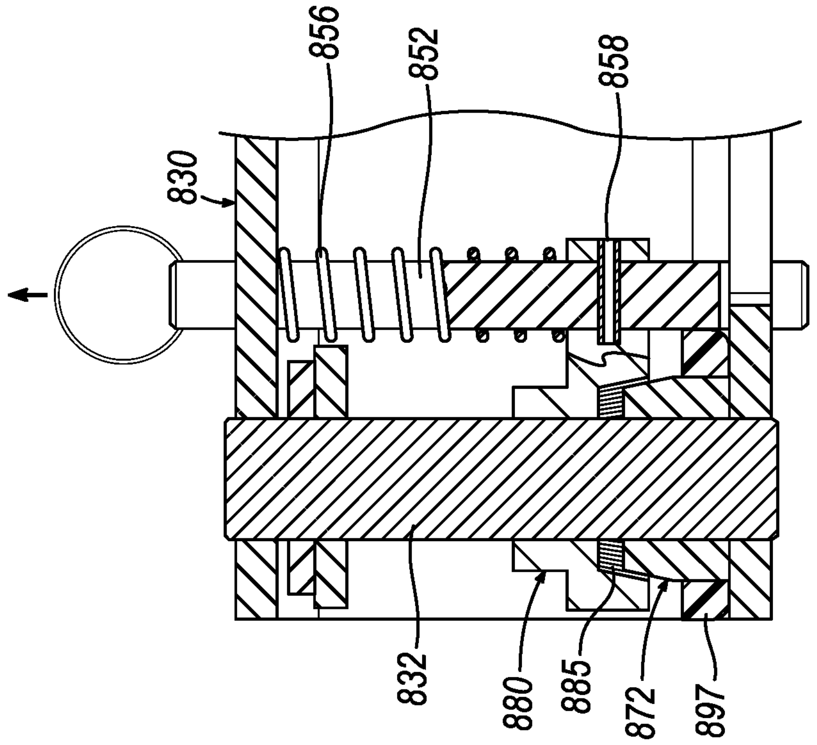
FIG. 16B is a sectional view of the pivot restraint mechanism of FIG. 11 in an unrestrained configuration.
Figure 16A:
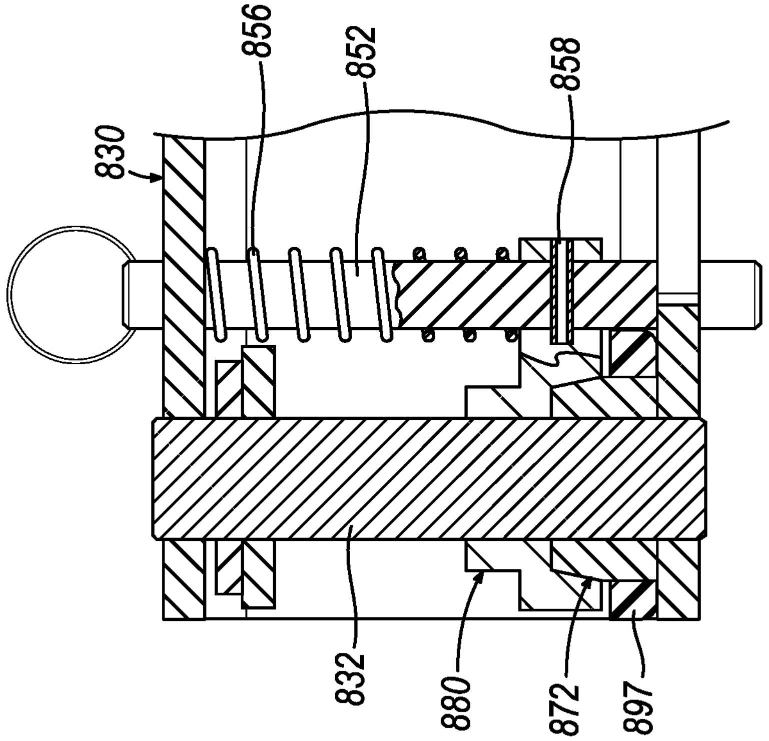
FIG. 16A is a cross-sectional view of the pivot restraint mechanism of FIG. 11 in a restrained configuration.

FIGS. 16A-16B show restraint mechanism (870) transitioning between a restrained configuration (FIG. 16A) and an unrestrained configuration (FIG. 16B). Bias spring (856) may be positioned coaxially with translating pin (852) such that when an operator lifts translating pin (852) to overcome bias spring (856), frame restraint body (880) lifts off of arm restraint body (872) to thereby transition from the restrained configuration to the unrestrained configuration. Once the operator stops lifting translating pin (852), bias spring (856) applies a force to lateral coupling portion (887) to thereby couple frame restraint body (880) with arm restraint body (872).

E. Fifth Illustrative Rotational Restraint Assembly

Figure 18:
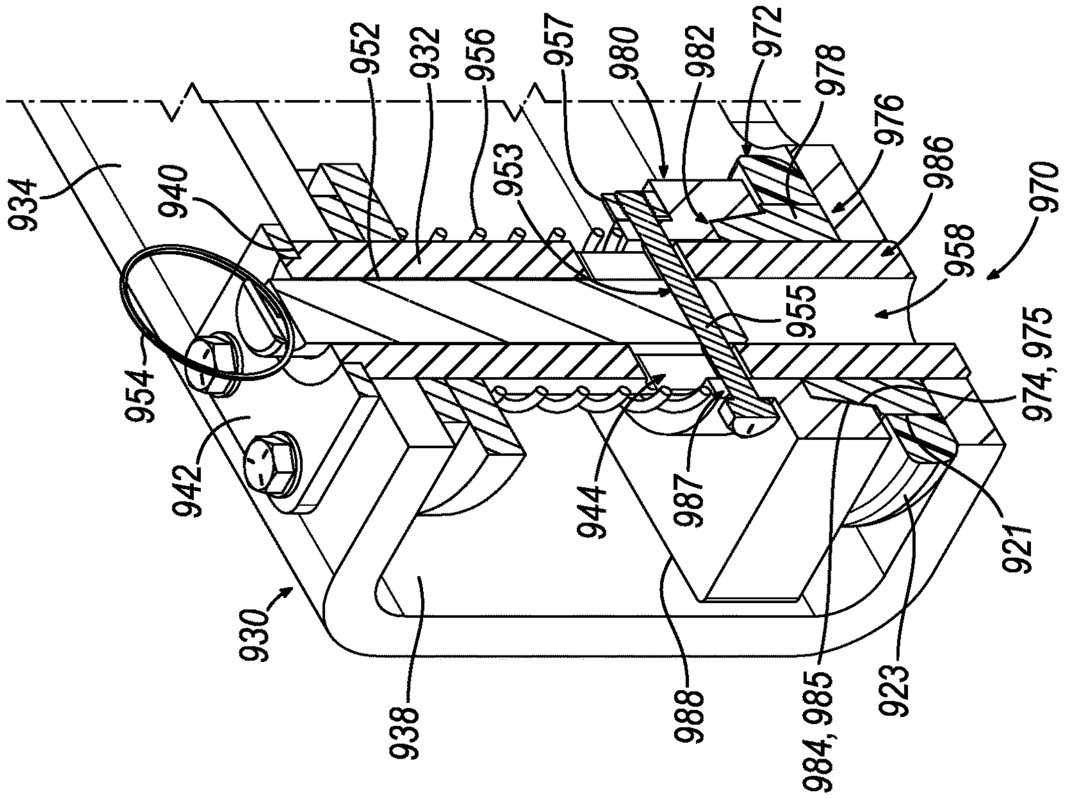
FIG. 18 is a sectional view of the pivot restraint mechanism of FIG. 17, taken along line 18-18 of FIG. 17.
Figure 17:
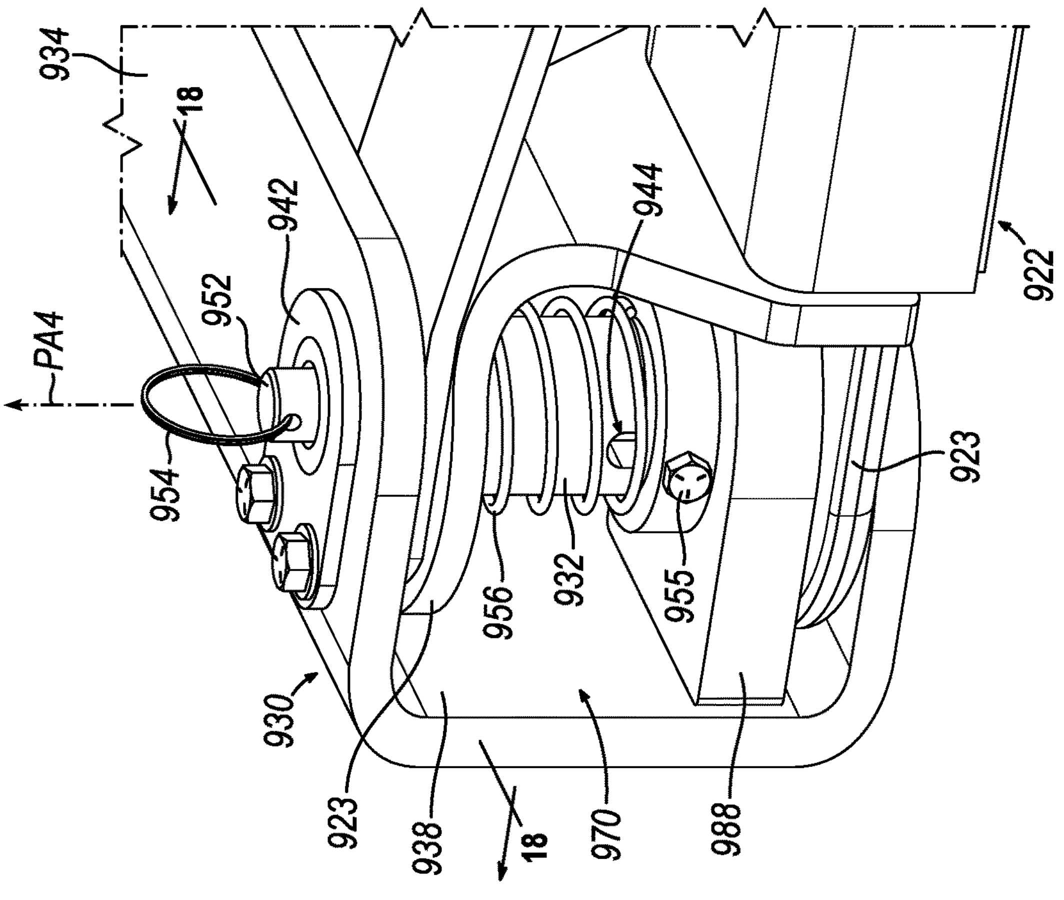
FIG. 17 is a perspective view of another alternative pivot restraint mechanism and an alternative lift arm, with the pivot restraint mechanism in a restrained configuration.
Figure 19:
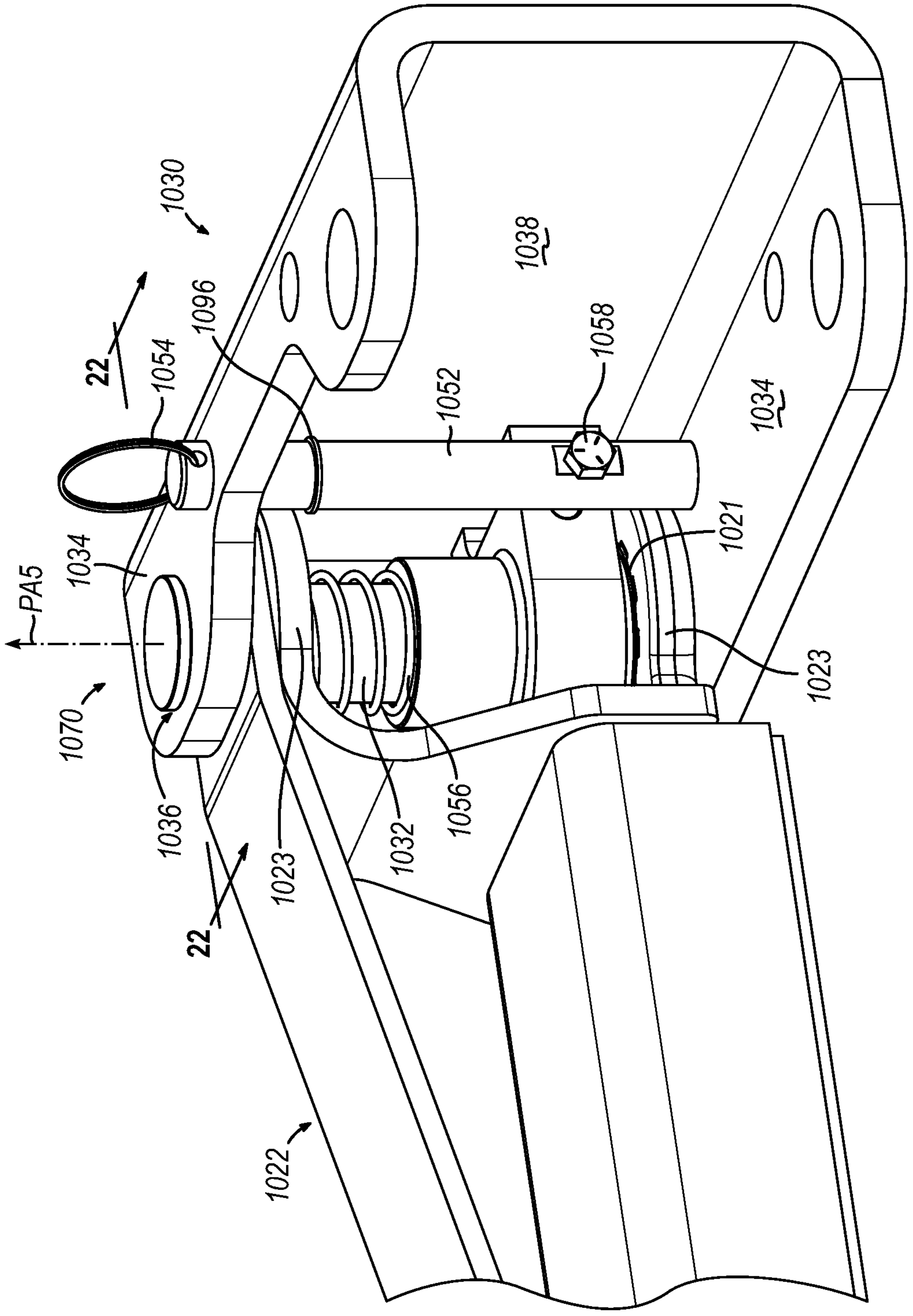
FIG. 19 is a perspective view of another alternative pivot restraint mechanism and an alternative lift arm, with the pivot restraint mechanism in a restrained configuration.

FIGS. 17 and 18 show another pivot restraint mechanism (970) used to couple a lift arm (922) with a base frame (930). Lift arm (922), base frame (930), and pivot restraint mechanism (970) may be substantially similar to lift arm (522), base frame (530), and pivot restraint mechanism (570) described above, respectively, with differences elaborated below. Therefore, lift arm (922) includes a pair of arm flanges (923) with the bottom arm flange (923) having a rotational stopping surface (921), which are substantially similar to arm flanges (523) with bottom arm flange (523) having rotational stopping surface (521) described above, respectively, with differences elaborated herein. Base frame (930) includes flanges (934) and a rotational stopping surface (938), which are substantially similar to flanges (534) and rotational stopping surface (538) described above, respectively, with differences elaborated herein.

Pivot restraint mechanism (970) includes an arm restraint body (972) and a base frame restraint body (980), which may be substantially similar to arm restraint body (572) and base frame restraint body (580) described above, respectively, with differences elaborated herein. Therefore, arm restraint body (972) includes a tapered external surface (974), a circumferential array of teeth or splines (975), a through hole (976), and a rotational stopping surface (978), which may be substantially similar to tapered external surface (574), circumferential array of teeth or splines (575), through hole (576), and rotational stopping surface (578) described above, respectively, with differences elaborated herein. Base frame restraint body (980) includes a cavity (982), a tapered internal surface (984), a circumferential array of teeth or splines (985), a through hole (986), and a rotational stopping surface (988); which may be substantially similar to cavity (582), tapered internal surface (584), circumferential array of teeth of splines (885), through hole (586), and rotational stopping surface (588) described above, respectively, with differences elaborated below.

Pivot restraint mechanism (970) also includes a bias spring (956), pivot pin (932), translating pin (952), and pull ring (954) that are substantially similar to bias spring (556), pivot pin (532), translating pin (592), and pull ring (554) described above, respectively, with differences elaborated below.

In the current example, pivot pin (932) defines a vertically extending channel (958) that extends along pivot axis (PA4). Pivot pin (932) also has an upwardly presented shoulder (940) that abuts against a retainment tab (942) located on upper flange (934) of base frame (930). Retainment tab (942) prevents pin (932) from being pulled upwardly out of associated with base frame (930). Retainment tab (942) may be placed on upper flange (934) after pin (932) is pivotally coupled with base frame (930). Retainment tab (942) may be able to selectively couple with upper flange (934) via at least one bolt or any other suitable attachment structures as would be apparent to one skilled in the art in view of the teachings herein.

Translating pin (952) is slidably housed within vertically extending channel (958) such that translating pin (952) is coaxially disposed with pivot pin (932). This coaxial alignment between translating pin (952) and pivot pin (932) may further save space and make the layout of pivot restraint mechanism (970) more compact. Translating pin (952) may be actuated relative to pivot pin (932) in order to transition pivot restraint mechanism (970) between locked and unlocked configurations.

Translating pin (952) defines a transverse through hole (953) that receives a coupling bolt (955). A collar portion of base frame restraint body (980) also defines a pair of lateral through holes (987) that also receive coupling bolt (955). A nut (957) is attached to one end of coupling bolt (955), thereby preventing coupling bolt (955) from dissociating with base frame restraint body (980) and translating pin (952). Therefore, translating pin (952), coupling bolt (955), and base frame restraint body (980) are configured to actuate with each other relative to arm restraint body (972), thereby allowing pivot restraint mechanisms (970) to transition between the locked and unlocked configurations in accordance with the description herein.

Pivot pin (932) also defines a vertically extending through slot (944). Vertically extending through slot (944) defines a path for translating pin (952), coupling bolt (955), and base frame restraint body (980) to actuate along between the locked and unlocked configurations. Vertically extending through slot (944) may also prevent translating pin (952) from being pulled upwardly or falling downwardly out of the confines of vertically extending channel (958) defined by pivot pin (932).

Bias spring (956) biases base frame restraint body (980) into the locked configuration in a substantially similar manner as bias spring (556) described above. If a user desires to rotate lift arm (922) relative to base frame (930), the user may pull ring (954) to actuate translating pin (952) upwardly within pin (932) such that base frame restraint body (980) is no longer engaged with lift arm restraint body (972), thereby actuating pivot restraint mechanism (970) into the unlocked configuration. Once lift arm (922) is rotated into a suitable position, the user may release pull ring (954) such that bias spring (956) drives base frame restraint body (980) back into engagement with lift arm restraint body (972).

Engagement between bolt (955), base frame restraint body (980), and translating pin (952) is loose enough such that little or no torque is transmitted from frame restraint body (980) onto translating pin (952) while pivot restraint mechanism is in the locked configuration in accordance with the teachings herein. Therefore, torque is transmitted from rotational stopping surface (988) onto base frame (930) prior to a substantial amount of torque being transmitted onto translating pin (952).

F. Sixth Illustrative Rotational Restraint Assembly

FIGS. 19-20 and 22A-22B show another pivot restraint mechanism (1070) used to couple a lift arm (1022) with a base frame (1030). Lift arm (1022), base frame (1030), and pivot restraint mechanism (1070) may be substantially similar to lift arm (522), base frame (530), and pivot restraint mechanism (570) described above, respectively, with differences elaborated below. Therefore, lift arm (1022) is configured to rotate about pivot axis (PA5) of pin (1032) relative to base frame (1030) in accordance with the description herein. Further, pivot restraint mechanism (1070) is configured to actuate between a restrained position (see FIGS. 19 and 22A) and an unrestrained position (see FIG. 22B), where lift arm (1022) is inhibited from rotating about pivot axis (PA5) relative to base frame (1030) while pivot restraint mechanism (1070) is in the restrained position, and lift arm (1022) is allowed to rotate about pivot axis (PA5) relative to base frame (1030) while pivot restraint mechanism (1070) is in the unrestrained position.

It should be understood that lift arm (1022) and base frame (1030) may be readily incorporated into two-post lift (10) in replacement of lift arm (22, 522, 622, 722, 822, 922) and base frame (30, 530, 630, 730, 830, 930) described above, respectively. It should also be understood that pivot restraint mechanism (1070) may also be incorporated in two-post lift (10) in association with both lift arm (1022) and base frame (1030).

Lift arm (1022) includes a pair of arm flanges (1023) with the bottom arm flange (1023) having a rotational stopping surface (1021), which are substantially similar to arm flanges (523) with bottom arm flange (523) having rotational stopping surface (521) described above, respectively, with differences elaborated herein. Base frame (1030) includes flanges (1034) defining pin holes (1036) and a rotational stopping surface (1038), which are substantially similar to flanges (534) defining pin holes (536) and rotational stopping surface (538) described above, respectively, with differences elaborated herein.

Pivot restraint mechanism (1070) includes an arm restraint body (1072) and a base frame restraint body (1080), which may be substantially similar to arm restraint body (572) and base frame restraint body (580) described above, respectively, with differences elaborated below. Therefore, base frame restraint body (1080) may actuate relative to arm restraint body (1072) between a restrained position (see FIG. 22A) and an unrestrained position (see FIG. 22B), where pivot restraint mechanism (1070) is configured to inhibit rotation of lift arm (1022) relative to base frame (1030) when in the restrained position and allows rotation of lift arm (1022) relative to base frame (1030) when in the unrestrained position.

As will be discussed in greater detail below, rather than restraint bodies (1072, 1080) having tapered surfaces (e.g., tapered surfaces (574, 584) of restraint bodies (572, 580) described above), restraint bodies (1072, 1080) have engagement surfaces (1074, 1084) and corresponding complementary splines (1075, 1085) that extend vertically in a direction substantially parallel to (A) pivot axis (PA5), and/or (B) the path along which base frame restraint body (1080) actuates to disengage from arm restraint body (1072) in accordance with the description herein.

Further, as will be discussed in greater detail below, arm restraint body (1072) includes a non-splined, pilot section (1073) that has a reduced radial length (i.e., radius, etc.) compared to splines (1075). Pilot section (1073) is interposed between a top end of arm restraint body (1072) and a top end of splines (1075) in order to promote proper alignment between external surface (1074) of arm restraint body (1074) and interior surface (1084) of base frame restraint body (1080) prior to splines (1075, 1085) suitably engaging with each other either during initial assembly of pivot restraint mechanism (1070) or when pivot restraint mechanism (1070) actuates from the unrestrained position into the restrained position in accordance with the description herein.

Figure 20:
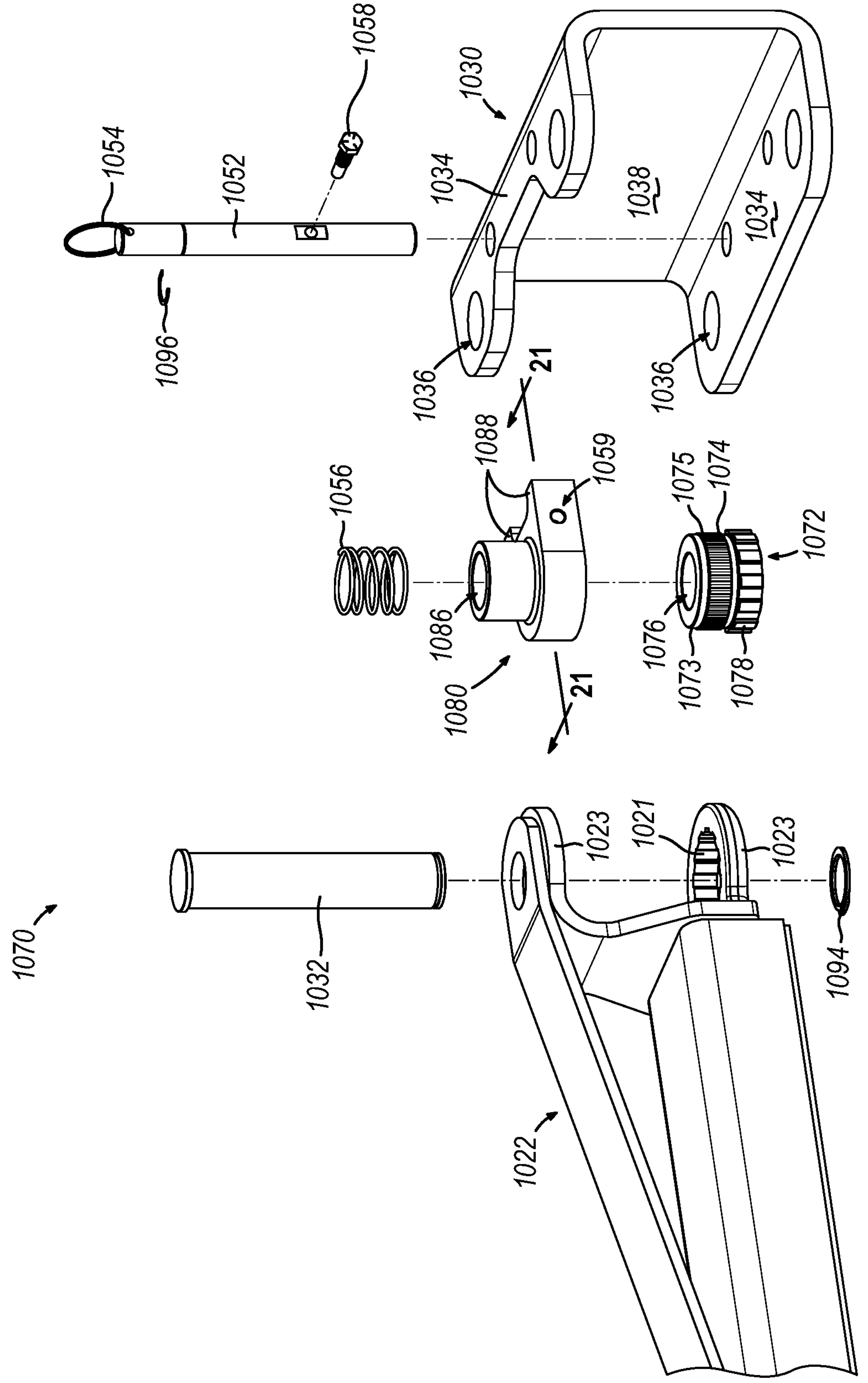
FIG. 20 is an exploded perspective view of the pivot restraint mechanism and lift arm of FIG. 19.
Figure 21A:
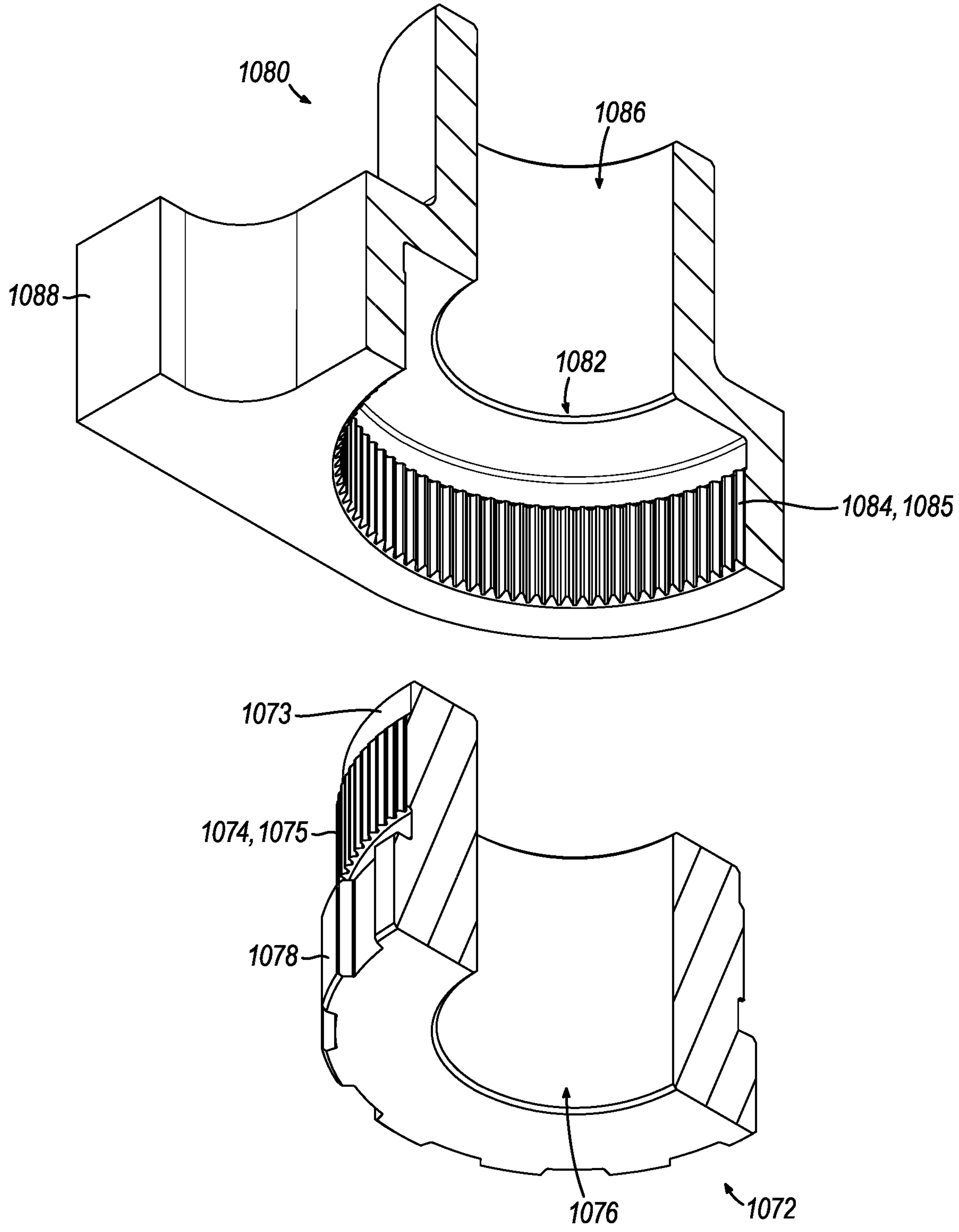
FIG. 21A is a sectional view, taken along line 21-21 of FIG. 20, of an arm restraint body and a base frame restraint body of the pivot restraint mechanism of FIG. 19, where the arm restraint body and the base frame restraint body are decoupled from each other.
Figure 21B:
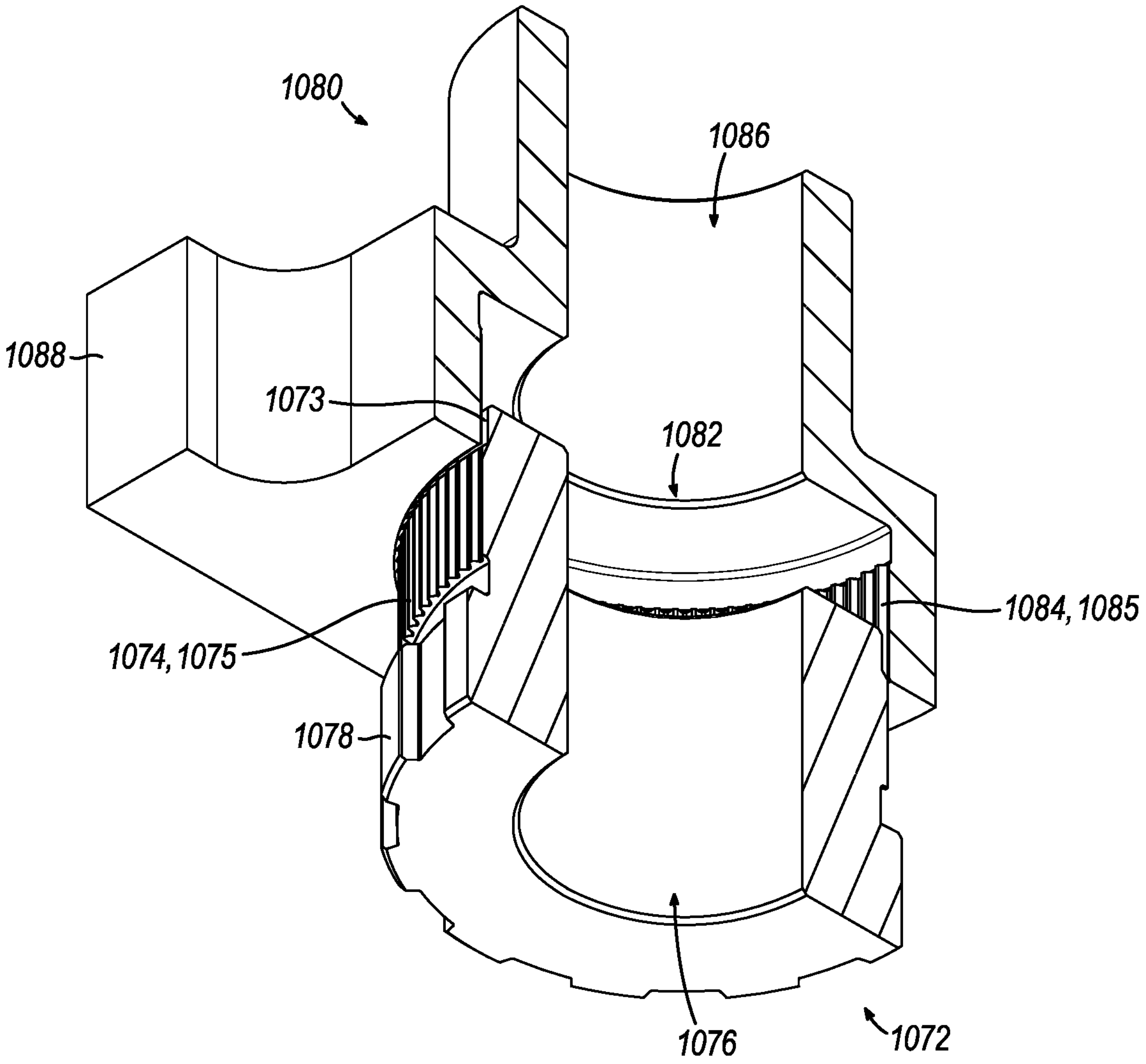
FIG. 21B is a sectional view, taken along line 21-21 of FIG. 20, of the arm restraint body and the base frame restraint body of FIG. 21A, where the arm restraint body and the base frame restraint body are initially coupled to each other.
Figure 21C:
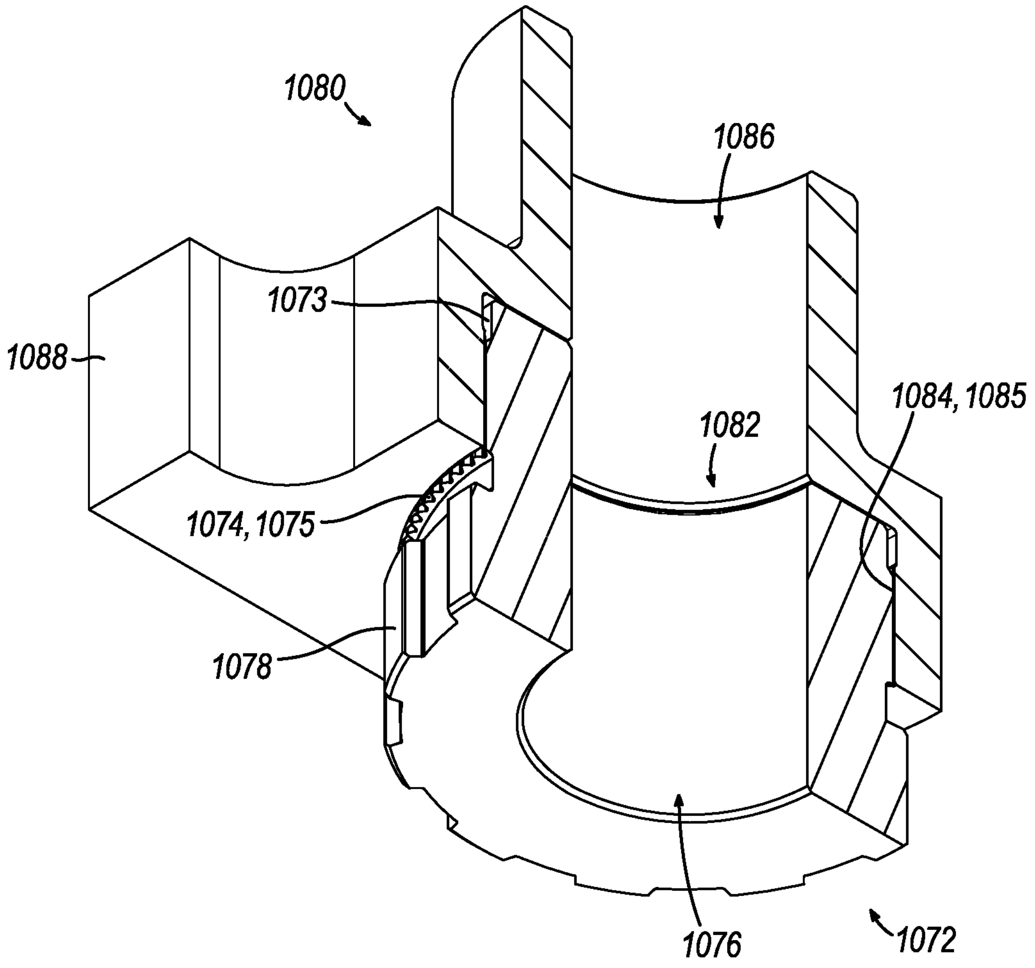
FIG. 21C is a sectional view, taken along line 21-21 of FIG. 20, of the arm restraint body and the base frame restraint body of FIG. 21A, where the arm restraint body and the base frame restraint body are coupled to each other.

Turning to FIGS. 20-21C, base frame restraint body (1080) includes internal surface (1084), a circumferential array of teeth or splines (1085) extending vertically along internal surface (1083), and a rotational stopping surface (1088). Further, base frame restraint body (1080) defines a through hole (1086) dimensioned to receive pin (1032) and a recessed opening (1059) dimensioned to receive a coupler (1058). Rotational stopping surface (1088), through hole (1086), and recessed opening (1058) may be substantially similar to rotational stopping surface (588), through hole (586), and recessed opening (559) described above, with differences elaborated herein. Therefore, base frame restraint body (1080) is configured to remain rotationally fixed about pivot axis (PA5) relative to base frame (1030) while also being able to vertically actuate along pivot axis (PA5) relative to base frame (1030) in accordance with the teachings herein.

Base frame restraint body (1080) also defines a cavity (1082) dimensioned to receive an external surface (1074) and splines (1075) of arm engagement body (1072). As mentioned above, internal surface (1084) and splines (1085) extend vertically in a direction substantially parallel to pivot axis (PA5) and/or the path along which base frame restraint body (1080) actuates between the restrained position and the unrestrained position.

Arm restraint body (1072) includes external surface (1074), a circumferential array of teeth or splines (1075) extending vertically along external surface (1074), and a series of rotational stopping splines (1078) located below external surface (1074). Further, as mentioned above, arm restraint body (1072) includes a non-splined pilot section (1073) located above splines (1075).

Arm restraint body (1072) defines a through hole (1076) dimensioned to receive pin (1032). Rotational stopping splines (1078) and through hole (1076) may be substantially similar to rotational stopping splines (578) and through hole (576) described above. Therefore, once assembled, arm restraint body (1072) is configured to rotate with lift arm (1022) relative to base frame (1030) about pivot axis (PA5) defined by pin (1032) in accordance with the teachings herein.

As mentioned above, rather than being tapered, external surface (1074) and splines (1075) of arm engagement body (1072) extend vertically in a direction substantially parallel to pivot axis (PA5) and/or the path which base frame restraint body (1080) actuates along between the restrained position and the unrestrained position. In the current example, external surface (1074) is cylindrical. However, external surface (1074) may have any suitable geometry as would be apparent to one skilled in the art in view of the teachings herein. For example, external surface (1074) may form a polygonal column. Splines (1075) are configured to mesh with complementary splines (1085) of base frame restraint body (1080) in the restrained configuration (see FIG. 22A), thereby inhibiting rotation of arm retrain body (1072) relative to base frame restraint body (1080) about pivot axis (PA5) in accordance with the description herein. Since base frame restraint body (1080) is rotationally fixed relative to base frame (1030), and since arm restraint body (1072) is rotationally fixed relative to lift arm (1022), engagement between splines (1075, 1085) inhibits lift arm (1022) from rotation about pivot axis (PA5) relative to base frame (1020).

If lift arm (1022) experiences a high torque load while pivot restraint mechanism (1070) is in the restrained position, the vertically extending nature of splines (1075, 1085) (e.g., extending substantially parallel with pivot axis (PA5) and/or the path which base frame restraint body (1080) actuates along between the restrained position and the unrestrained position) may reduce the amount of force required to separate base frame engagement body (1080) from arm engagement body (1072) in accordance with the description herein, as compared to other spline arrangements (e.g., tapered, conical, helical, etc.).

As shown between FIGS. 21A-21B, non-splined pilot section (1073) is configured to be initially inserted into cavity (1082) defined by base frame restraint body (1080). Pilot section (1073) has reduced radial profile compared to splines (1075) such that pilot section (1073) may be initially inserted into cavity (1082) prior to splines (1075, 1085) being aligned with each other to suitably mesh (as exemplified in FIG. 21C). In other words, while splines (1075) extend laterally outward from external surface (1074), non-splined pilot section (1073) either (A) does not extend laterally outward from external surface (1074), (B) does not extend laterally outward from external surface (1074) as far as splines (1075), or (C) extends laterally inward from external surface (1074). Therefore, non-splined pilot section (1073) has a cross-sectional lateral length that is smaller than the cross-sectional lateral length of the section of external surface (1074) including splines (1075).

Therefore, during either initial assembly or when pivot restraint mechanism (1070) transitions from the unrestrained configuration (see FIG. 22B) into the restrained configuration (see FIG. 22A) during illustrative use, pilot section (1073) may help initially guide base frame restraint body (1080) in receiving external surface (1074). Once pilot section (1073) is initially housed within cavity (1082), as shown in FIG. 21B, lateral movement between restraint body (1072, 1080) is limited via engagement between pilot section (1073) and internal surface (1084). Such restriction in lateral movement may help promote splines (1075, 1085) initially aligning/meshing with each other in order to suitably reach the restrained configuration shown in FIG. 21C.

Pivot restraint mechanism (1070) also includes a bias spring (1056), pivot pin (1032), translating pin (1052) defining a transverse through hole (1055), pull ring (1054), retaining ring (1094), pin clip (1096), and coupler (1058); which may be substantially similar to bias spring (556), pivot pin (532), translating pin (552) defining transverse through hole (555), pull ring (554), retaining ring (594), pin clip (596), and coupler (558) described above, respectively, with differences elaborated below.

Therefore, pivot pin (1032) is inserted within the coil of bias spring (1056) such that bias spring (1056) extends coaxially with pivot pin (1032) along pivot axis (PA5). Pivot pin (1032) is also located within pin holes (1036) of base frame (1030), openings of flanges (1023), and through holes (1076, 1086) of restraint bodies (1072, 1080). Therefore, pivot pin (1032) pivotally couples lift arm (1022) with base frame (1030).

Bias spring (1056) is interposed between upper flange (1023) of lift arm (1022) and a top surface of base frame restraint body (1080) to thereby impart a downward bias onto base frame restraint body (1080), urging pivot restraint mechanism (1070) into the restrained position (see FIGS. 19 and 22A), which inhibits lift arm (1022) from pivoting relative to base frame (1030) about pivot axis (PA5).

Figure 22A:
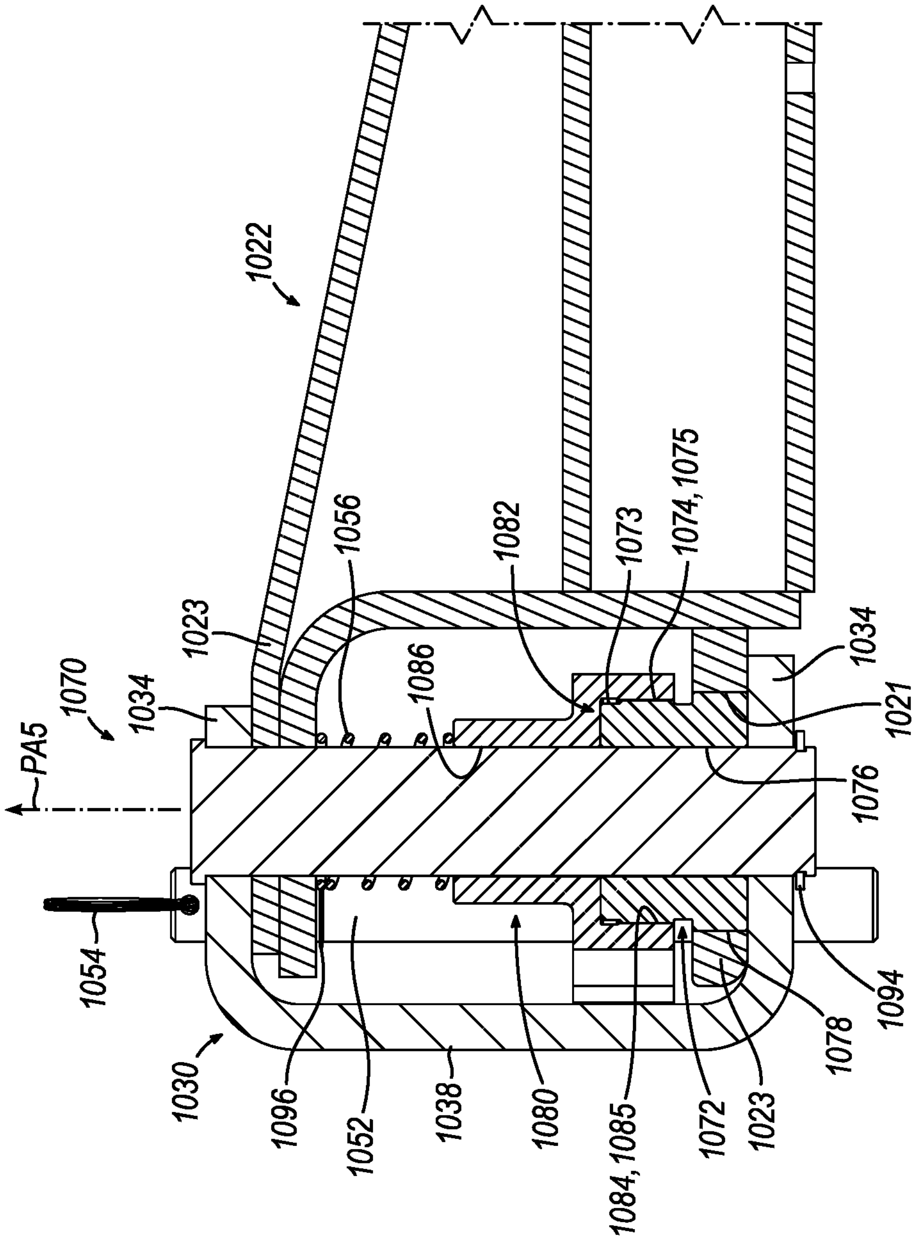
FIG. 22A is a cross sectional view, taken along line 22-22 of FIG. 19, in a restrained configuration.
Figure 22B:
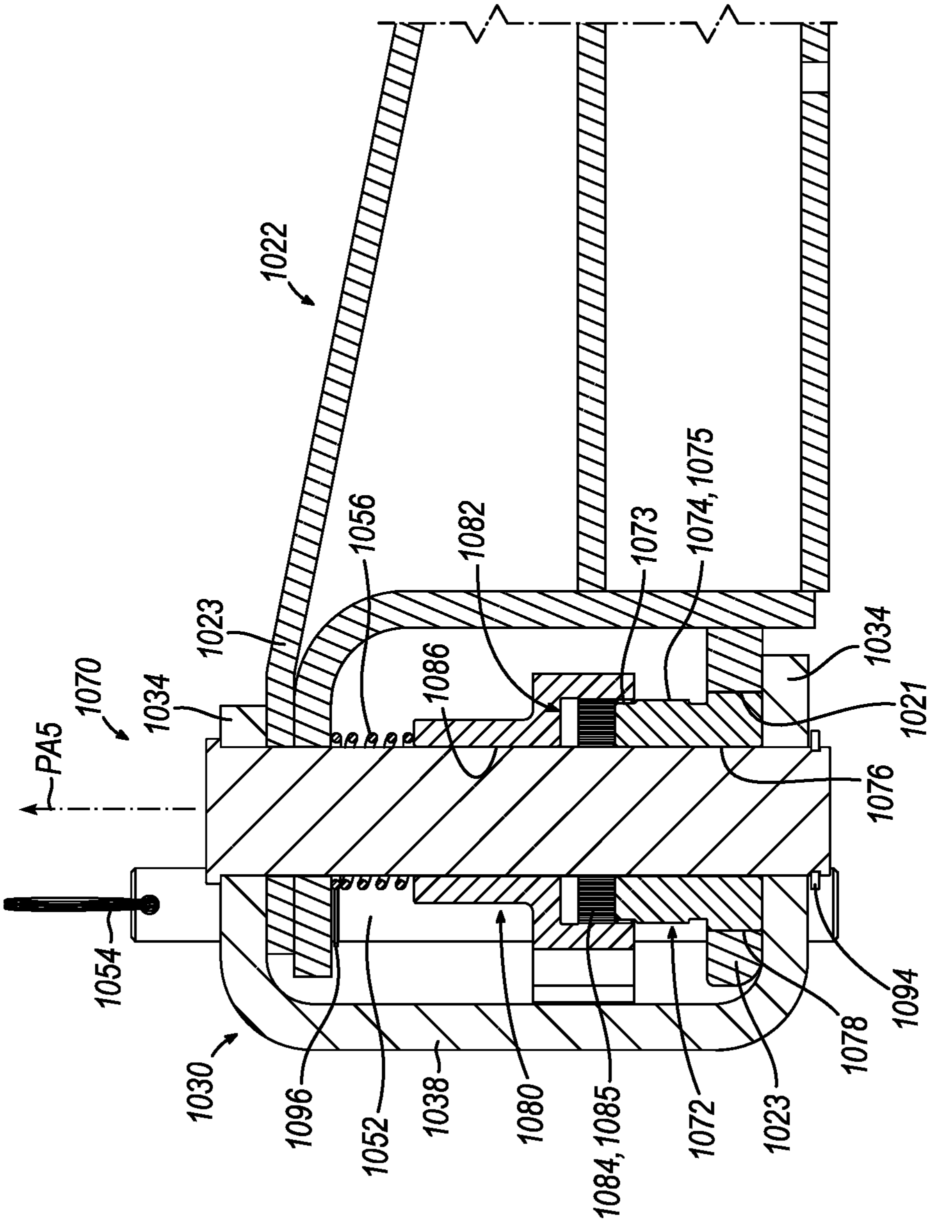
FIG. 22B is a cross sectional view, taken along line 22-22 of FIG. 19, in an unrestrained configuration.
Figure 23:
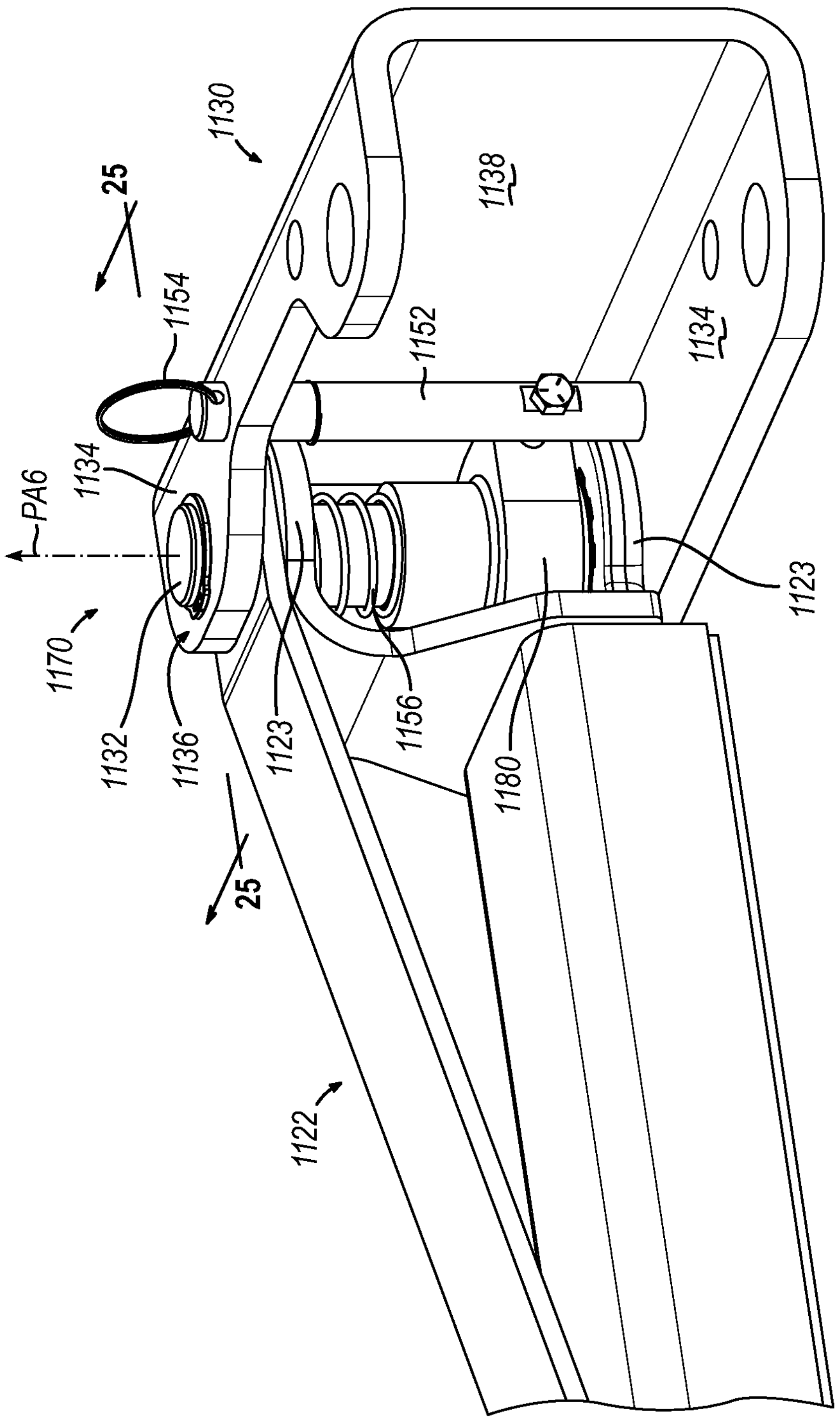
FIG. 23 is a perspective view of another alternative pivot restraint mechanism and an alternative lift arm, with the pivot restraint mechanism in a restrained configuration.
Figure 24:
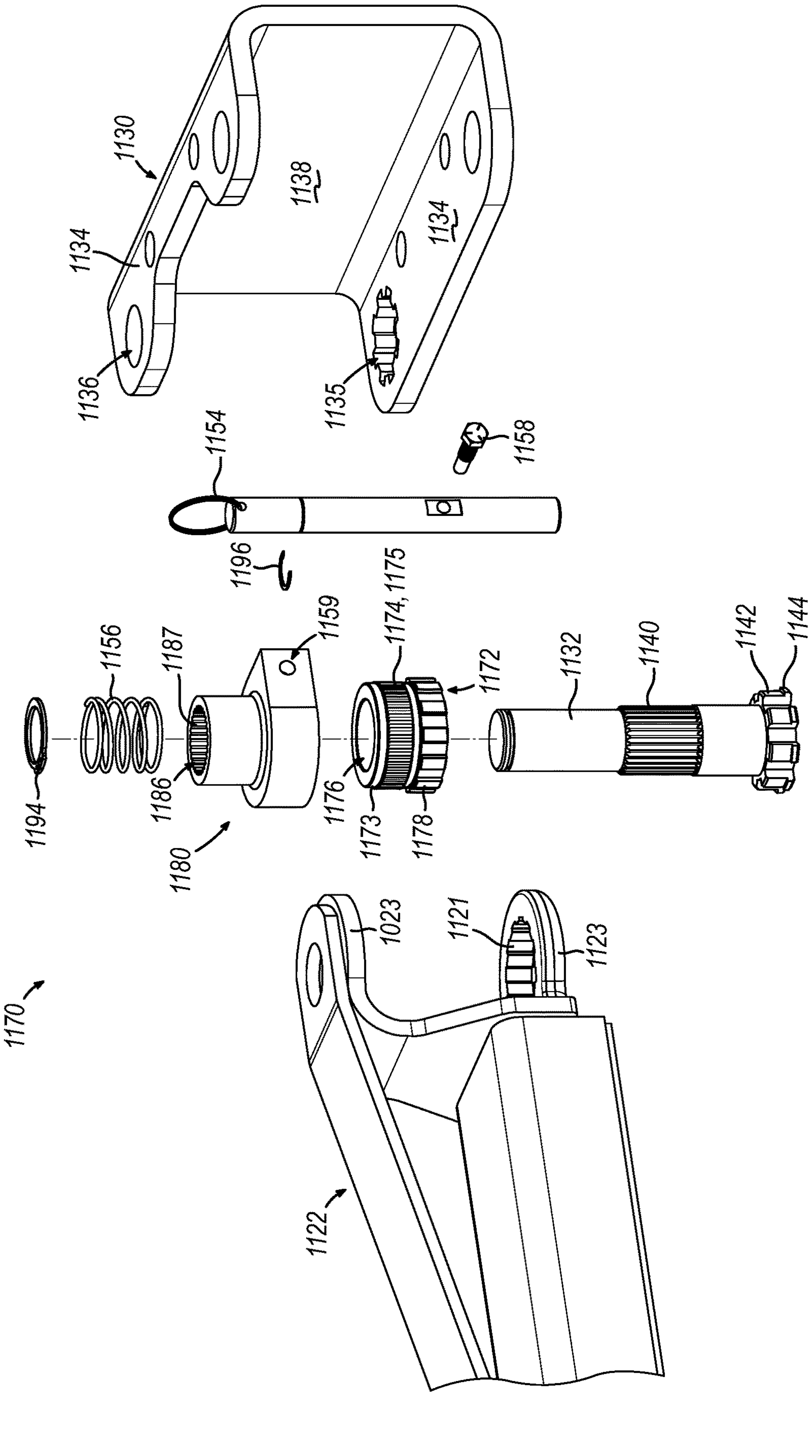
FIG. 24 is an exploded perspective view of the pivot restraint mechanism and lift arm of FIG. 23.

Further, translating pin (1052) is slidably coupled to base frame (1030) and is attached to base frame restraining body (1080) via coupler (1058), which extends through both transverse through hole (1055) and recessed opening (1059). Pull ring (1054) may be used to overcome the downward bias of bias spring (1056) to actuate base frame restraint body (1080) from the restrained position (see FIGS. 19 and 22A) into the unrestrained position (see FIG. 22B), in which lift arm (1022) is allowed to rotate relative to base frame (1030) about pivot axis (PA5). Once the lift arm (1022) achieves the desired rotational position relative to base frame (1030) about pivot axis (PA5), the user may release pull ring (1054) such that bias spring (1056) urges base frame restraining body (1080) downward back toward arm restraint body (1072), thereby driving pivot restraint mechanism (1070) into the restrained position as shown in FIG. 22A.

G. Seventh Illustrative Rotational Restraint Assembly

In some instances, it may be desirable to inhibit rotation of pivot pin (532, 632, 732, 832, 932, 1032) relative to base frame (530, 630, 730, 830, 930, 1030), such that pivot pin (532, 632, 732, 832, 932, 1032) remains rotationally fixed relative to base frame (530, 630, 730, 830, 930, 1030) about the pivot axis defined by pivot pin (532, 632, 732, 832, 932, 1032) during illustrative use in accordance with the description herein.

FIGS. 23-25B show another pivot restraint mechanism (1170) used to couple a lift arm (1122) with a base frame (1130). Lift arm (1122), base frame (1130), and pivot restraint mechanism (1170) may be substantially similar to lift arm (1022), base frame (1030), and pivot restraint mechanism (1070) described above, respectively, with differences elaborated below. Therefore, lift arm (1122) is configured to rotate about pivot axis (PA6) of pin (1132) relative to base frame (1130) in accordance with the description herein. Further, pivot restraint mechanism (1170) is configured to actuate between a restrained position and an unrestrained position; where lift arm (1122) is inhibited from rotating about pivot axis (PA6) relative to base frame (1130) while pivot restraint mechanism (1170) is in the restrained position, and lift arm (1122) is allowed to rotate about pivot axis (PA6) relative to base frame (1130) while pivot restraint mechanism (1170) is in the unrestrained position. Additionally, as will be described in greater detail below, pivot restraint mechanism (1170) includes a pin (1132) with at least one anti-rotational feature (1140, 1142) configured to inhibit rotation of pivot pin (1132) relative to base frame (1130) during illustrative use.

It should be understood that lift arm (1122) and base frame (1130) may be readily incorporated into two-post lift (10) in replacement of lift arm (22, 522, 622, 722, 822, 922, 1022) and base frame (30, 530, 630, 730, 830, 930, 1030) described above, respectively. It should also be understood that pivot restraint mechanism (1170) may also be incorporated in two-post lift (10) in association with both lift arm (1122) and base frame (1130).

Lift arm (1122) includes a pair of arm flanges (1123) with the bottom arm flange (1123) having a rotational stopping surface (1121), the pair of arm flanges (1123) being substantially similar to arm flanges (1023) with bottom arm flange (1023) having rotational stopping surface (1021) described above, respectively, with differences elaborated herein. Base frame (1130) includes flanges (1134) and a rotational stopping surface (1138), which are substantially similar to flanges (1034) and rotational stopping surface (1038) described above, respectively, with differences elaborated herein. As will be described in greater detail below, a flange (1134) (in the current example, the bottom flange (1134)) defines an anti-rotational pin hole (1135) dimensioned to receive a corresponding portion of pin (1132) in order to rotationally fix pin (1132) relative to base frame (1130) about pivot axis (PA6) when assembled and utilized in accordance with the teachings herein.

Pivot restraint mechanism (1170) includes an arm restraint body (1172) and a base frame restraint body (1180), which may be substantially similar to arm restraint body (572, 1072) and base frame restraint body (580, 1080) described above, respectively, with differences elaborated below. Therefore, base frame restraint body (1180) may actuate relative to arm restraint body (1172) between a restrained position and an unrestrained position, where pivot restraint mechanism (1170) is configured to inhibit rotation of lift arm (1122) relative to base frame (1130) when in the restrained position and allow rotation of lift arm (1122) relative to base frame (1130) when in the unrestrained position. As will be discussed in greater detail below, base frame restraint body (1180) also includes at least one anti-rotational pin spline (1187) dimensioned to receive a corresponding portion of pin (1132) in order to rotationally fix pin (1132) relative to base frame (1130) about pivot axis (PA6) when assembled and utilized in accordance with the teachings herein.

Arm restraint body (1172) includes an upper pilot section (1173), an external surface (1174), vertically extending splines (1175), through hole (1176), and rotational stopping splines (1178), which may be substantially similar to upper pilot section (1073), external surface (1074), vertically extending splines (1075), through hole (1076), and rotational stopping splines (1078) described above, with differences elaborated below. Therefore, arm restraint body (1172) is configured to remain rotationally fixed about pivot axis (PA6) relative to lift arm (1122) during illustrative use in accordance with the description herein. Additionally, splines (1175) of arm restraint body (1172) are configured to selectively engage corresponding splines (1185) of base frame restraint body (1180) in order to selectively inhibit rotation of lift arm (1122) relative to base frame (1130) in accordance with the description herein.

Base frame restraint body (1180) includes a cavity (1182), an internal surface (1184), vertically extending splines (1185), a through hole (1186), and a rotational stopping surface (1188), which may be substantially similar to cavity (1082), internal surface (1084), vertically extending splines (1085), through hole (1086), and rotational stopping surface (1088) described above, respectively, with differences elaborated herein. Therefore, base frame restraint body (1180) is configured to remain rotationally fixed about pivot axis (PA6) relative to the base frame (1130), while also being able to vertically actuate along pivot axis (PA6) relative to base frame (1130) in accordance with the teachings herein. Base frame restraint body (1180) is configured to actuate relative to arm restraint body (1172) in order to selectively engage/disengage splines (1175, 1185) to thereby transition pivot restraint mechanisms between the restrained position and the unrestrained position in accordance with the description herein. Additionally, in the current example, base frame restraint body (1180) includes one or more anti-rotational pin splines (1187) defining a portion of through hole (1186) dimensioned to receive pin (1132).

Pivot restraint mechanism (1170) also includes a bias spring (1156), pivot pin (1132), translating pin (1152) defining a transverse through hole (1155), pull ring (1154), retaining ring (1194), pin clip (1196), and coupler (1158), which may be substantially similar to bias spring (1056), pivot pin (1032), translating pin (1052) defining transverse through hole (1055), pull ring (1054), retaining ring (1094), pin clip (1096), and coupler (1058) described above, respectively, with differences elaborated below.

Therefore, once assembled, bias spring (1156) extends coaxially with pivot pin (1132) about pivot axis (PA6), while pivot pin (1132) pivotally couples lift arm (1122) with base frame (1130). Bias spring (1156) is interposed between upper flange (1123) of lift arm (1122) and a top surface of base frame restraint body (1180) to thereby impart a downward bias onto base frame restraint body (1180), urging pivot restraint mechanism (1170) into the restrained position (see FIG. 23), which inhibits lift arm (1122) from pivoting relative to base frame (1130) about pivot axis (PA6). Further, translating pin (1152) and pull ring (1154) may be used to overcome the downward bias of bias spring (1156) to actuate base frame restraining body (1180) from the restrained position (in which lift arm (1122) is inhibited from rotating relative to base frame (1130) about pivot axis (PA6)) into the unrestrained position (in which lift arm (1122) is allowed to rotate relative to base frame (1130) about pivot axis (PA6)). Once lift arm (1122) achieves the desired rotational position relative to base frame (1130) about pivot axis (PA6), the user may release pull ring (1154) such that bias spring (1156) urges base frame restraint body (1180) downward back toward arm restraint body (1172), thereby driving pivot restraint mechanism (1170) into the restrained position.

As mentioned above, pin (1132) includes at least one anti-rotation feature (1140, 1142), while a flange (1134) of base frame (1130) and base frame restraint body (1180) each include a respective complementary anti-rotation pin feature (1135, 1187) configured to mesh with a corresponding anti-rotation feature (1140, 1142) of pin (1132). Engagement between anti-rotation feature (1140, 1142) of pin (1132) and anti-rotation pin features (1135, 1187) are configured to inhibit rotation of pivot pin (1132) relative to base frame (1130) during illustrative use. Engagement between such anti-rotation features (1140, 1142, 1135, 1187) may remain constant after pivot restraint mechanism (1170) is assembled, such that pin (1132) remains rotationally fixed relative to base frame (1130) about pivot axis (PA6).

In the current example, pin (1132) includes a first set of anti-rotation splines (1140) extending in a circumferential array around an exterior surface of pin (1132). Once pin (1132) is assembled in accordance with the description herein, anti-rotational splines (1140) of pin (1132) suitably mesh with complementary anti-rotation pin splines (1187) of base frame restraint body (1180). Engagement between splines (1140) of pin (1132) and splines (1187) of base frame restraint body (1180) inhibit pin (1132) from rotating relative to base frame restraint body (1180) about pivot axis (PA6). As also mentioned above, once assembled, base frame restraint body (1180) is inhibited from rotating relative to base frame (1130) about pivot axis (PA6) due to engagement between rotational stopping surfaces (1138, 1188). Therefore, when pin (1132) is assembled, engagement between splines (1140, 1187) rotationally fixes pin (1132) about pivot axis (PA6) relative to base frame (1130).

While complementary splines (1140, 1187) are used in the current illustrative example in order to rotationally fix pin (1132) relative to base frame (1130); pin (1132) and base frame restraint body (1180) may have other suitable complementary anti-rotational geometries configured to suitably engage each other as would be apparent to one skilled in the art in view of the teachings herein. For example, pin (1132) may include a D-shaped cross-sectional profile, while a corresponding portion of base frame restraint body (1180) defining though hole (1186) may include a complementary D-shaped profile dimensioned to house the D-shaped section of pin (1132). As another example, pin (1132) may include a vertically extending keyed projection/slot, while base frame restraint body (1180) may include a complementary vertically extending slot/keyed projection configured to mate with each other to thereby inhibit rotation of pin (1132).

In the current example, pin (1132) also includes a second set of anti-rotation splines (1142) located on a lower portion of pin (1132) underneath the first set of anti-rotation splines (1140). Once pin (1132) is assembled in accordance with the description herein, anti-rotational spines (1142) of pin (1132) suitably mesh with complementary anti-rotational pin hole (1135) of flange (1135) of base frame (1130). Engagement between splines (1142) of pin (1132) and complementary anti-rotational pin hole (1135) of base frame (1130) inhibit pin (1132) from rotating relative to base frame restraint (1130) about pivot axis (PA6).

Anti-rotation splines (1142) in some examples, including the current example, also include a stopping ledge (1144). Stopping ledge (1144) is configured to abut against the underside of lower flange (1134) in order to prevent pin (1132) from being over-inserted through anti-rotation pin hole (1135) during assembly. While stopping ledge (1144) is used in the current example, any other suitable structures may be used in order to prevent over-insertion of pin (1132) as would be apparent to one skilled in the art in view of the teachings herein. For example, a separate retention ring may be disposed over a suitable portion of pin (1132) in order to inhibit such over-insertion.

While splines (1142) and anti-rotation pin hole (1135) are used in the current illustrative example to rotationally fix pin (1132) relative to base frame (1130), pin (1132) and base frame (1130) may have other suitable complementary anti-rotational geometries configured to suitably engage each other as would be apparent to one skilled in the art in view of the teachings herein. For example, pin (1132) may include a D-shaped cross-sectional profile, while a corresponding portion of base frame (1130) defining anti-rotational pin hole (1135) may include a complementary D-shaped profile dimensioned to house the D-shaped section of pin (1132). As another example, pin (1132) may include a vertically extending keyed projection/slot, while base frame (1130) may include a complementary vertically extending slot/keyed projection configured to mate with each other to thereby inhibit rotation of pin (1132).

While in the current example pin (1132) has two anti-rotational features (1140, 1142) configured to suitably engage portions of base frame restraint body (1180) and base frame (1130), respectively, in some instances, pin (1132) may include only one anti-rotation feature. Such a singular anti-rotation feature may be configured to engage just base frame restraint body (1180), just base frame (1130), both base frame restraint body (1180) and base frame (1130), or some other suitable intermediary component that may allow pin (1132) to be rotationally fixed relative to base frame (1130).

Figure 25A:
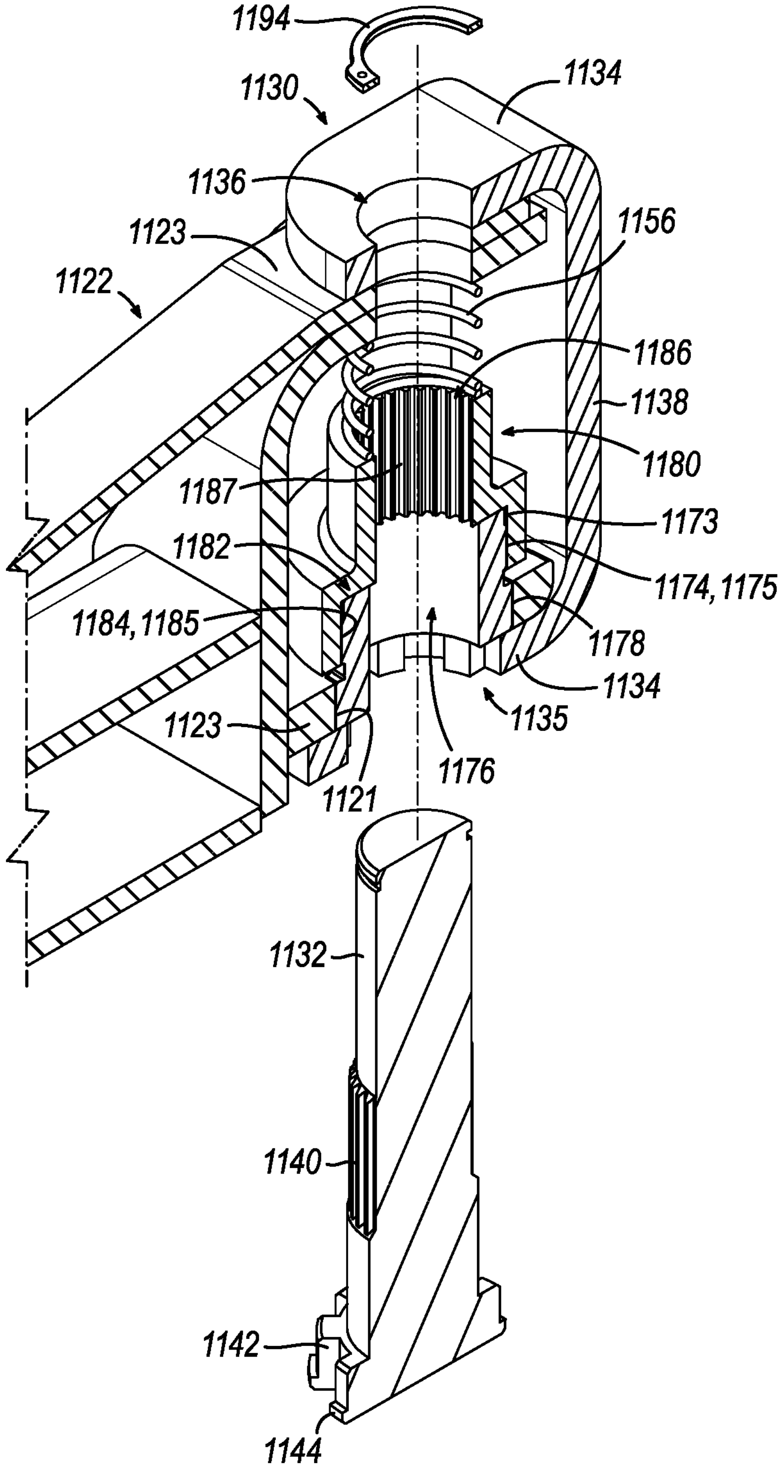
FIG. 25A is a sectional view of the pivot restraint mechanism and lift arm of FIG. 23, taken along line 25-25 of FIG. 23, with a pivot pin decoupled from the rest of the pivot restraint mechanism.
Figure 25B:
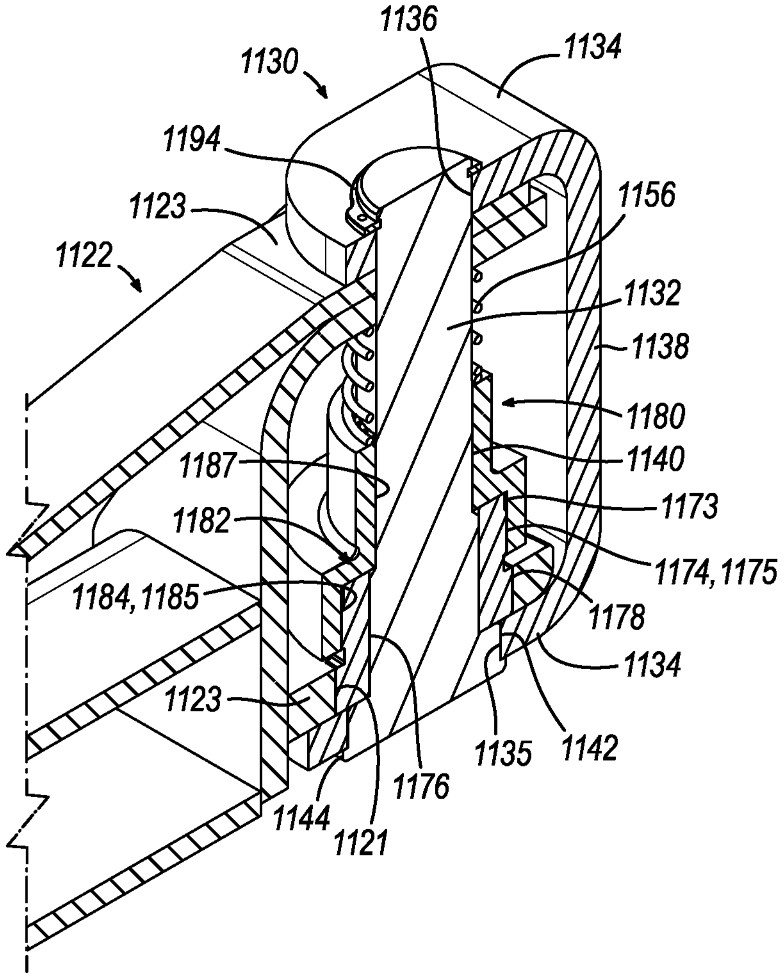
FIG. 25B is a sectional view of the pivot restraint mechanism and lift arm of FIG. 23, taken along line 25-25 of FIG. 23, with the pivot pin of FIG. 25A coupled with the rest of the pivot restraint mechanism.

FIGS. 25A-25B show an illustrative attachment of pin (1132) to the rest of pivot restraint mechanism (1170) in order to pivotally couple lift arm (1122) with base frame (1130). As shown in FIG. 25A, flanges (1124) of lift arm (1122) are suitably housed between flanges (1134) of base frame (1130) such that openings defined by flanges (1124) are suitably aligned with pin holes (1135, 1136) of base frame (1130). Additionally, arm restraint body (1172) is suitably coupled with the lower flange (1124) of lift arm (1122) via splines (1178) and rotational stopping surface (1121) such that arm restraint body (1172) is rotationally fixed to lift arm (1122). Further, base frame restraint body (1180) is also suitably engaged with arm restraint body (1172) and rotational stopping surface (1128) of base frame (1130) such that through holes (1186, 1176) are suitably aligned to receive pin (1132). Bias spring (1156) is also interposed between upper flange (1123) of lift arm (1122) and base frame restraint body (1180). Further, bias spring (1156) is suitably aligned with pin hole (1136) and though hole (1186) of base frame restraint body (1180).

With other components of pivot restraint mechanism (1170) ready to receive pin (1132), the end of pin (1132) opposite of anti-rotation splines (1142) may be inserted initially through anti-rotational pin hole (1135) of lower flange (1134). As shown in FIG. 25B, pin (1132) may be inserted into through holes (1176, 1186), through bias spring (1156), and through upper flanges (1123, 1134) until a top end of pin (1132) extends vertically above a top surface of upper flange (1134) and/or until stopping ledge (1144) engages the under surface of lower flange (1134).

While inserting pin (1132) upwards, anti-rotation splines (1140) may suitably engage anti-rotation pin splines (1187) of base frame restraint body (1180). Further, while inserting pin (1132) upwards, anti-rotation splines (1142) may suitably engage anti-rotation pin hole (1135). As such, once pin (1132) is fully inserted, pin (1132) may be inhibited from rotating relative to base frame (1130) about pivot axis (PA6).

With pin (1132) fully inserted, as also shown in FIG. 25B, a user may place retention ring (1194) around the portion of pin (1132) extending above the top surface of upper flange (1134) in order to inhibit pin (1132) from falling downward and out of engagement with the rest of pivot restraint mechanism (1170).

Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1: A vehicle engagement assembly attached to a vehicle lift, wherein the vehicle lift is configured to actuate the engagement assembly between a lowered position and a raised position, and wherein the vehicle engagement assembly comprises: (a) a base frame comprising a first pair of flanges, each defining a respective base pin hole, (b) a lift arm comprising an upper flange defining an arm pin hole and a lower flange, wherein the lift arm is pivotally attached to the base frame by a pin about a pivot axis, and (c) a pivot restraint mechanism configured to inhibit rotation of the lift arm relative to the base frame about the pivot axis, the pivot restraint mechanism comprising: (i) an arm restraint body associated with the lift arm and located at least partially between the upper flange and the lower flange of the lift arm, wherein the pin extends through the arm restraint body, (ii) a base frame restraint body associated with the base frame and located between the upper flange and the lower flange of the lift arm, wherein the pin extends through the base frame restraint body, and (iii) a rotational stopping surface associated with either: (A) the base frame restraint body between the upper and lower flanges of the lift arm, or (B) the arm restraint body, wherein the rotational stopping surface is configured to abut against a corresponding surface of either the base frame restraint body or the arm restraint body in order to rotationally fix either the base frame restraint body or the arm restraint body to the respective base frame or lift arm about the pivot axis.

Example 2: The vehicle engagement assembly of Example 1, wherein the pivot restraint mechanism is configured to selectively transition between a restrained and an unrestrained configuration, wherein the restrained configuration is configured to inhibit rotation of the lift arm relative to the base frame, wherein the unrestrained configuration is configured to allow rotation of the lift arm relative to the base frame.

Example 3: The vehicle engagement assembly of Example 2, wherein the arm restraint body includes a first set of splines, and the base frame restraint body includes a second set of splines, wherein the first and second sets of splines are configured to engage with each other when the vehicle engagement assembly is in the restrained configuration.

Example 4: The vehicle engagement assembly of any one or more of Examples 1 through 3, the arm restraint body including a first set of rotation stopping surfaces, the lower flange of the lift arm including a second set of rotation stopping surfaces, the first and second set of rotation stopping surfaces being configured to inhibit rotation between the arm restraint body and the lift arm.

Example 5: The vehicle engagement assembly of Example 4, wherein the arm restraint body is vertically supported by a lower flange of the first pair of flanges of the base frame.

Example 6: The vehicle engagement assembly of any one or more of Examples 1 through 5, wherein the base frame restraint body is coupled with a translating pin, wherein the translating pin is laterally offset from the pin, and wherein the translating pin is configured to selectively translate the base frame restraint body away from the arm restraint body.

Example 7: The vehicle engagement assembly of Example 7, wherein the selective translation of the base frame restraint body is along the pivot axis.

Example 8: The vehicle engagement assembly of any one or more of Examples 1 through 7, the vehicle engagement assembly further including a bias spring, wherein the bias spring is configured to bias the base frame restraint body towards the arm restraint body to thereby inhibit rotation of the lift arm relative to the base frame about the pivot axis.

Example 9: The vehicle engagement assembly of Example 8, wherein the bias spring is a coil spring positioned coaxially with the pin.

Example 10: The vehicle engagement assembly of either Example 8 or 9, wherein the bias spring is axially offset from the pin.

Example 11: The vehicle engagement assembly of any one or more of Examples 1 through 10, further comprising a sleeve positioned between the base frame restraint body and the pin, the sleeve being configured to support the pin.

Example 12: The vehicle engagement assembly of any one or more of Examples 1 through 11, the pin being vertically supported by a pin flange positioned against the base frame.

Example 13: The vehicle engagement assembly of any one or more of Examples 1 through 12, the pin including a pin restraint positioned below the base frame and configured to inhibit the pin from vertical movement.

Example 14: The vehicle engagement assembly of any one or more of Examples 1 through 13, the pivot restraint mechanism further comprising a bushing positioned between the base frame restraint body and the arm restraint body, the bushing being coaxial with the pin.

Example 15: The vehicle engagement assembly of any one or more of Examples 1 through 14, the base frame restraint body including a flat surface, the base frame including a plane, wherein the flat surface and the plane are configured to collectively inhibit rotation of the lift arm relative to the base frame about the pivot axis.

Example 16: A vehicle engagement assembly attached to vehicle lift, wherein the vehicle lift is configured to actuate the engagement assembly between a lowered position and a raised position, the vehicle engagement assembly comprises: (a) a base frame comprising a first pair of flanges, each defining a respective base pin hole, (b) a lift arm comprising an upper flange defining an arm pin hole and a lower flange, wherein the lift arm is pivotally attached to the base frame by a pin about a pivot axis, and (c) a pivot restraint mechanism configured to inhibit rotation of the lift arm relative to the base frame about the pivot axis, the pivot restraint mechanism comprising: (i) an arm restraint body associated with the arm, wherein the pin extends through the arm restraint body, (ii) a base frame restraint body associated with the base frame, wherein the pin extends through the base frame restraint body, (iii) a translating pin coupled to the base frame restraint body, and (iv) a bias spring disposed about the pin, wherein the bias spring is configured to bias the base frame restraint body toward the arm restraint body.

Example 17: The vehicle engagement assembly of Example 16, wherein the bias spring is positioned coaxially with the pin.

Example 18: The vehicle engagement assembly of Example 16, wherein the bias spring is positioned coaxially with the translating pin.

Example 19: A method of inhibiting rotation of a vehicle lift arm of a vehicle lift using a vehicle engagement assembly, the vehicle lift comprising a base frame and a pin, the base frame comprising a pair of flanges connected to each other via a web, the vehicle engagement assembly comprising a base frame restraint body and an arm restraint body, wherein the base frame, vehicle lift arm, base frame restraint body and the arm restraint body are coaxially positioned about the pin, the method comprising: (a) rotationally fixing the arm restraint body with the vehicle lift arm, (b) rotationally fixing the base frame restraint body with a base frame via direct engagement between the base frame restraint body and the web of the base frame, and (c) selectively coupling the arm restraint body with the base frame restraint body.

Example 20: The method of Example 19, further comprising biasing the base frame restraint body toward the arm restraint body to thereby inhibit rotation of the vehicle lift arm relative to the base frame.

I claim:

1. A vehicle engagement assembly attached to a vehicle lift, wherein the vehicle lift is configured to actuate the engagement assembly between a lowered position and a raised position, the vehicle engagement assembly comprising:

(a) a base frame comprising a first pair of flanges, each defining a respective base pin hole, (b) a lift arm comprising an upper flange defining an arm pin hole and a lower flange, wherein the lift arm is pivotally attached to the base frame by a pin about a pivot axis, and (c) a pivot restraint mechanism configured to inhibit rotation of the lift arm relative to the base frame about the pivot axis, the pivot restraint mechanism comprising:

(i) an arm restraint body associated with the lift arm and located at least partially between the upper flange and the lower flange of the lift arm, wherein the pin extends through the arm restraint body, (ii) a base frame restraint body associated with the base frame and located between the upper flange and the lower flange of the lift arm, wherein the pin extends through the base frame restraint body, wherein the base frame restraint body is rotationally fixed relative to the base frame about the pivot axis, and (iii) a rotational stopping surface associated with either:

(A) the base frame restraint body between the upper and lower flanges of the lift arm; or (B) the arm restraint body, wherein the rotational stopping surface is configured to abut against a corresponding surface of either the base frame restraint body or the arm restraint body to rotationally fix either the base frame restraint body or the arm restraint body to the respective base frame or lift arm about the pivot axis;

wherein the pivot restraint mechanism is configured to selectively transition between a restrained configuration and an unrestrained configuration, wherein the restrained configuration is configured to inhibit rotation of the lift arm relative to the base frame, and wherein the unrestrained configuration is configured to allow rotation of the lift arm relative to the base frame; and wherein the base frame restraint body is configured to move relative to the base frame in order to transition the pivot restraint mechanism between the restrained configuration and the unrestrained configuration.

2. The vehicle engagement assembly of claim 1, wherein the arm restraint body includes a first set of splines, and the base frame restraint body includes a second set of splines, wherein the first and second sets of splines are configured to engage with each other when the vehicle engagement assembly is in the restrained configuration.

3. The vehicle engagement assembly of claim 1, the arm restraint body including a first set of rotation stopping surfaces, the lower flange of the lift arm including a second set of rotation stopping surfaces, the first and second set of rotation stopping surfaces being configured to inhibit rotation between the arm restraint body and the lift arm.

4. The vehicle engagement assembly of claim 3, wherein the arm restraint body is vertically supported by a lower flange of the first pair of flanges of the base frame.

5. The vehicle engagement assembly of claim 1, wherein the base frame restraint body is coupled with a translating pin, wherein the translating pin is laterally offset from the pin, and wherein the translating pin is configured to selectively translate the base frame restraint body away from the arm restraint body.

6. The vehicle engagement assembly of claim 5, wherein the selective translation of the base frame restraint body is along the pivot axis.

7. The vehicle engagement assembly of claim 1, the vehicle engagement assembly further including a bias spring, wherein the bias spring is configured to bias the base frame restraint body toward the arm restraint body to thereby inhibit rotation of the lift arm relative to the base frame about the pivot axis.

8. The vehicle engagement assembly of claim 7, wherein the bias spring is a coil spring positioned coaxially around the pin.

9. The vehicle engagement assembly of claim 7, wherein the bias spring is axially offset from the pin.

10. The vehicle engagement assembly of claim 1, further comprising a sleeve positioned between the base frame restraint body and the pin, the sleeve being configured to support the pin.

11. The vehicle engagement assembly of claim 1, the pin being vertically supported by a pin flange positioned against the base frame.

12. The vehicle engagement assembly of claim 1, the pin including a pin restraint positioned below the base frame and configured to inhibit the pin from vertical movement.

13. The vehicle engagement assembly of claim 1, the pivot restraint mechanism further comprising a bushing positioned between the base frame restraint body and the arm restraint body, the bushing being coaxial with the pin.

14. The vehicle engagement assembly of claim 1, the base frame restraint body including a flat surface, the base frame including a corresponding surface, wherein the flat surface and the corresponding surface are configured to collectively inhibit rotation of the lift arm relative to the base frame about the pivot axis.

15. A vehicle engagement assembly attached to vehicle lift, wherein the vehicle lift is configured to actuate the engagement assembly between a lowered position and a raised position, the vehicle engagement assembly comprises:

(a) a base frame comprising a first pair of flanges, wherein each flange of the first pair of flanges includes a section defining a respective base pin hole, wherein the base frame further comprises a web coupled to and extending between the first pair of flanges, wherein the web is positioned at least a first lateral distance away from the section of each flange of the first pair of flanges that defines the respective base pin hole, (b) a lift arm comprising an upper flange defining an arm pin hole and a lower flange, wherein the lift arm is pivotally attached to the base frame by a pin about a pivot axis, and (c) a pivot restraint mechanism configured to inhibit rotation of the lift arm relative to the base frame about the pivot axis, the pivot restraint mechanism comprising:

(i) an arm restraint body associated with the arm, wherein the pin extends through the arm restraint body, (ii) a base frame restraint body associated with the base frame, wherein the base frame restraint body is in direct contact with the web, wherein the pin extends through the base frame restraint body, (iii) a translating pin coupled to the base frame restraint body, and (iv) a bias spring disposed about the pin, wherein the bias spring is configured to bias the base frame restraint body toward the arm restraint body.

16. The vehicle engagement assembly of claim 15, wherein the bias spring is coaxially positioned about the pin.

17. The vehicle engagement assembly of claim 15, wherein the bias spring is coaxially positioned about the translating pin.

18. A method of inhibiting rotation of a vehicle lift arm of a vehicle lift using a vehicle engagement assembly, the vehicle lift comprising a base frame and a pin, the base frame comprising a pair of flanges connected to each other via a web, and the vehicle engagement assembly comprising a base frame restraint body and an arm restraint body, wherein the base frame, vehicle lift arm, base frame restraint body and the arm restraint body are coaxially positioned about the pin; wherein the pin includes an axis; and wherein the vehicle lift arm is rotatable about the axis; the method comprising:

(a) rotationally fixing the arm restraint body with the vehicle lift arm, (b) rotationally fixing the base frame restraint body with the base frame via direct engagement between the base frame restraint body and the web of the base frame, (c) selectively coupling the arm restraint body with the base frame restraint body to thereby inhibit rotation of the vehicle lift arm, wherein at least one of the base frame restraint body or the arm restraint body is located between the pair of flanges of the base frame, and (d) moving the base frame restraint body relative to the base frame and the arm restraint body to selectively allow or inhibit rotation of the vehicle lift arm.

19. The method of claim 18, the method further comprising biasing the base frame restraint body toward the arm restraint body to thereby inhibit rotation of the vehicle lift arm relative to the base frame.

* * * * *